(12) United States Patent
Wu

(10) Patent No.: US 9,500,834 B2
(45) Date of Patent: Nov. 22, 2016

(54) APPARATUS FOR COMPENSATING IMAGE OF DISPLAY AND METHOD FOR MANUFACTURING SAME

(71) Applicant: Ye Xin Technology Consulting Co., Ltd., Hsinchu (TW)

(72) Inventor: I-Wei Wu, Hsinchu (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 392 days.

(21) Appl. No.: 14/164,139

(22) Filed: Jan. 25, 2014

(65) Prior Publication Data
US 2014/0218960 A1    Aug. 7, 2014

(30) Foreign Application Priority Data

Feb. 5, 2013  (TW) .............................. 102104487 A
Sep. 27, 2013  (TW) .............................. 102135213 A

(51) Int. Cl.
G02B 6/46        (2006.01)
G02B 6/08        (2006.01)

(52) U.S. Cl.
CPC . *G02B 6/46* (2013.01); *G02B 6/08* (2013.01); *Y10T 29/49826* (2015.01); *Y10T 156/1062* (2015.01)

(58) Field of Classification Search
CPC ........ G02B 6/08; G02B 6/46; G02B 6/0078; G02B 6/0008; Y10T 29/49826; Y10T 156/1062; G02F 1/13336; G02F 1/133524; G09F 9/3026; F21V 2200/10; F21V 2200/20; F21W 2121/00; G06F 3/042
See application file for complete search history.

(56) References Cited

U.S. PATENT DOCUMENTS

2011/0255301 A1* 10/2011 Watanabe ........... G02F 1/13336
                                                              362/558

FOREIGN PATENT DOCUMENTS

CN        101889228 A      11/2010
CN        102216972 A      10/2011

* cited by examiner

*Primary Examiner* — Stephen F Husar
*Assistant Examiner* — Danielle Allen
(74) *Attorney, Agent, or Firm* — Zhigang Ma

(57) ABSTRACT

An apparatus for compensating an image of a display, includes a light incident surface, a light emitting surface, and a plurality of light guiding channels. An area of the light emitting surface is greater than an area of the light incident surface. The plurality of light guiding channels is independent from each other, each light guiding channel extends from the light incident surface to the light emitting surface, and light from the light incident surface is extended to the light emitting surface by the light guiding channels. The present invention further discloses a method for manufacturing the same.

12 Claims, 30 Drawing Sheets

APPARATUS FOR COMPENSATING IMAGE OF DISPLAY AND METHOD FOR MANUFACTURING SAME

CROSS-REFERENCE TO RELATED APPLICATIONS

This application is related to a U.S. patent application Ser. No. 14/164,136 and entitled "APPARATUS FOR COMPENSATING IMAGE OF DISPLAY, DISPLAY AND JOINT DISPLAY", a U.S. patent application Ser. No. 14/164,140 and entitled "APPARATUS FOR COMPENSATING IMAGE OF DISPLAY AND METHOD FOR MANUFACTURING SAME", a U.S. patent application Ser. No. 14/164,137 and entitled "DISPLAY ELEMENT, DISPLAY DEVICE AND JOINT DISPLAY", and a U.S. patent application Ser. No. 14/164,118 and entitled "DISPLAY DEVICE, JOINT DISPLAY AND BACKLIGHT MODULE". This application also claims the foreign priority application filed in Taiwan as Serial No. 102104487 on Feb. 5, 2013, and Serial No. 102135213 on Sep. 27, 2013. These related applications are incorporated herein by reference

BACKGROUND

1. Technical Field

The present disclosure relates to an image compensating apparatus and manufacturing method thereof, and more particularly, to an image compensating apparatus disposed upon a display panel and manufacturing method thereof.

2. Description of Related Art

As the development of technology, display technical is more and more employed to communicate which is indispensable. Because display panel with narrow border is more and more popular, the border of display panel is tended to be manufactured narrower. In a display panel, some electronic units are disposed on the edge thereof, a narrow border is disposed correspondingly to support the electronic unit, therefore, the border can not be omitted. However, in some situation, in order to obtain a display panel of a relative large size, such as more than 200 inches, for displaying much more various information, it may be manufactured by a large number of serialization displays jointed together in a plane. The borders between two adjacent display panels jointing together may reduce a displaying quality. So, the border is manufactured narrower or un-visible, that is helpful for a signal display panel, or a jointed display panels to eliminate non-display regions, or display image on a screen larger than a reality display region of such display panels.

Therefore, there is room for improvement in the art.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will now be made to the drawings to describe various embodiments in detail.

Figure 1:
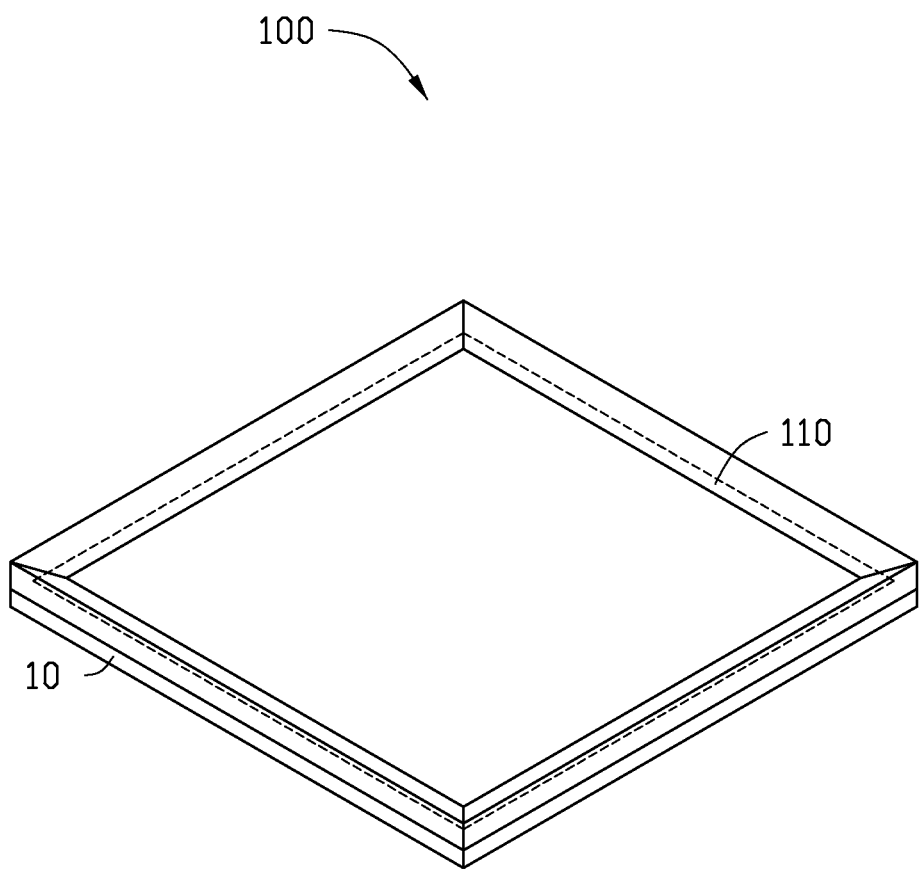
FIG. 1 a schematic, isometric view of a first embodiment of a display of the present disclosure.
Figure 2:
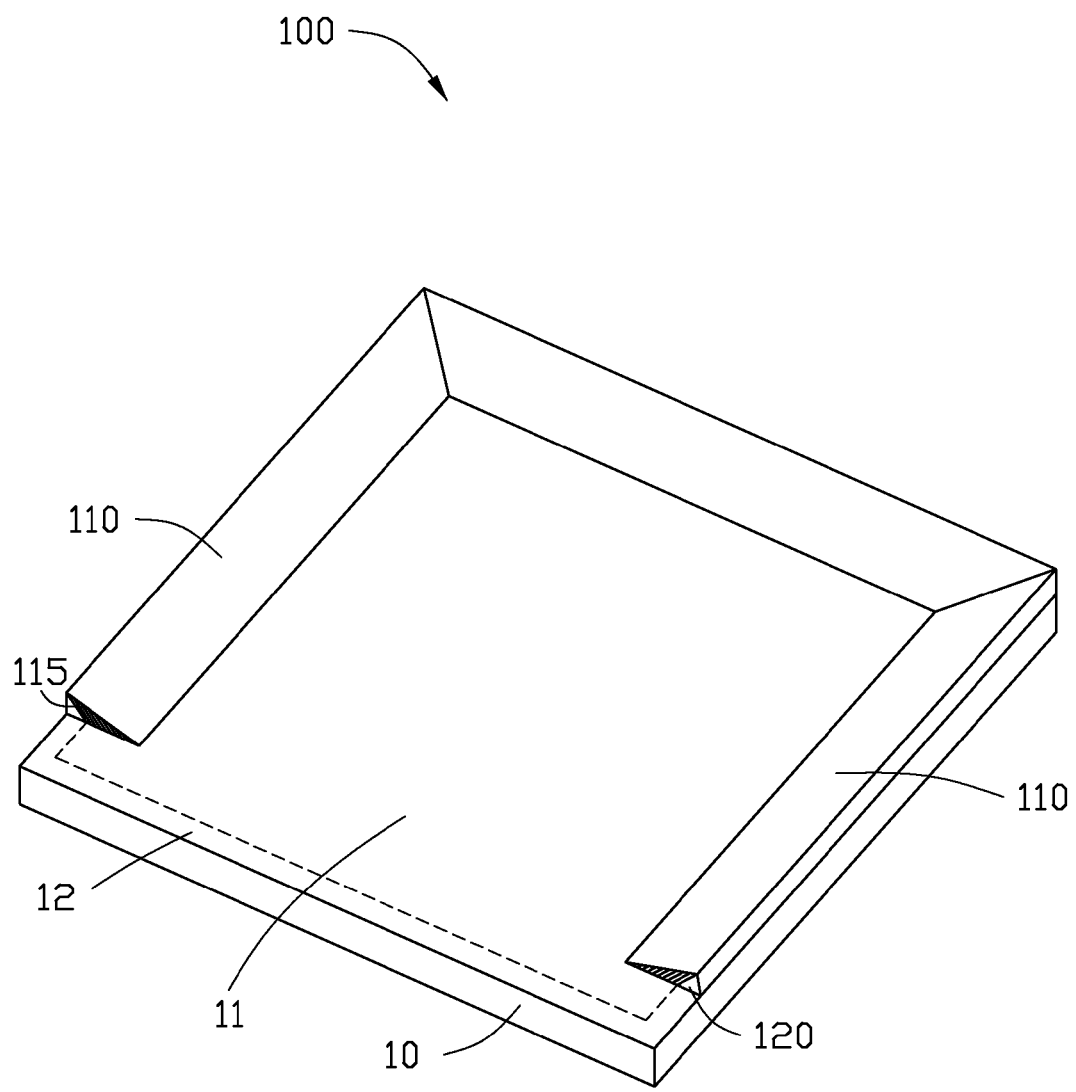
FIG. 2 is a partial cutaway view of the display.

FIG. 1 is a schematic, isometric view of a first embodiment of a display of the present disclosure. The display 100 includes a display panel 10, an image compensating apparatus 110 set on the display panel 10, and a support portion 120. FIG. 2 is a partial cutaway view of the display 100. The display panel 10 defines a display region 11 and a non-display region 12 encircling a periphery of the display region 11. The image compensating apparatus 110 is set on display region 11 along a border between the display region 11 and the non-display region 12. A covering portion 115 of the image compensating apparatus 110 is extended to cover the non-display region 12. The image compensating apparatus 110 is used to enlarge a display area of the display region 11 to cover the non-display region 12. The support portion 120 is set on the non-display region 11 to support the image compensating apparatus 110. In this embodiment, the support portion 120 resists again the covering portion 115 to support the covering portion 115. It is understood that, for a joint display consisting of a number of display panels 10, the image compensating apparatus 110 is set at a border between two adjacent display panels 10. In this embodiment, there are four image compensating apparatuses 110 set on the non-display regions 12. Referring to a top view of FIG. 3, each of the image compensating apparatuses 110 is shaped as an isosceles trapezoid. The four image compensating apparatuses 110 are connected end to end to form a rectangular frame. In the other alternative embodiment, the support portion can be omitted.

Figure 3:
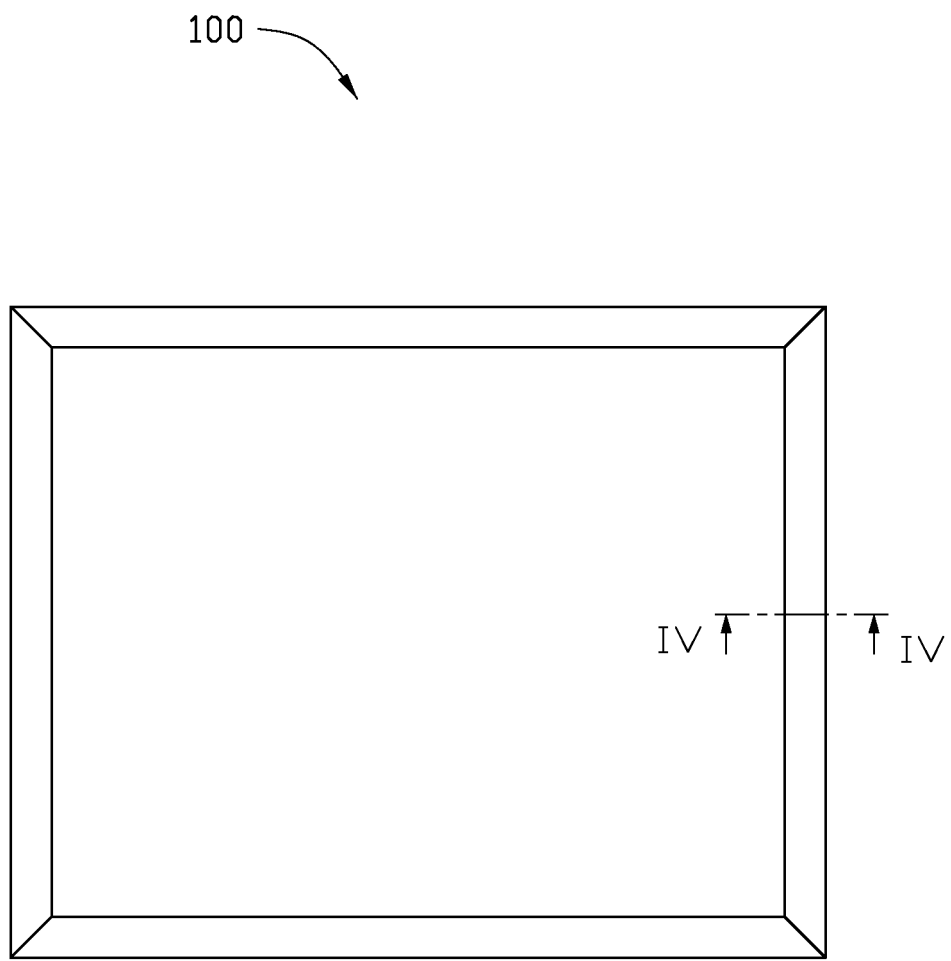
FIG. 3 is a top view of the display of FIG. 1.
Figure 4:
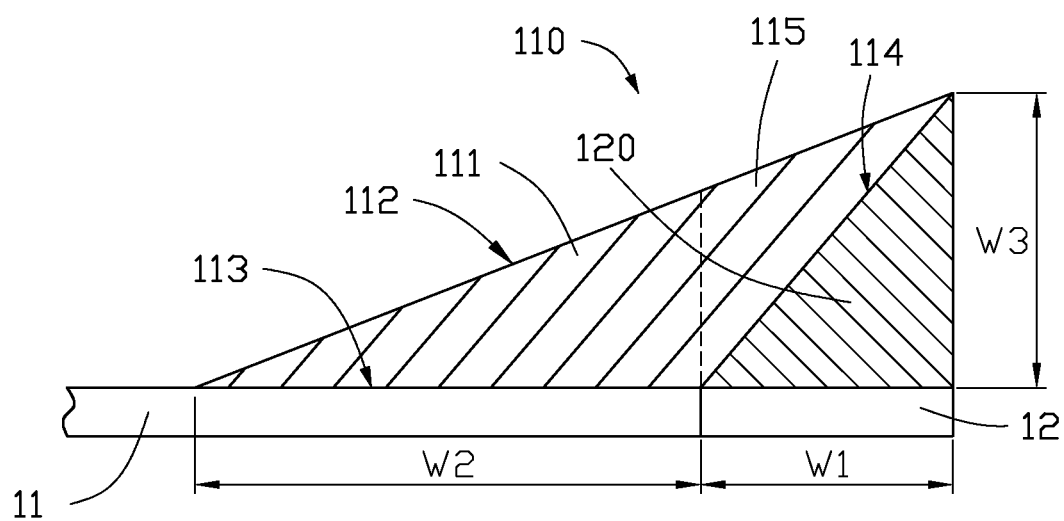
FIG. 4 is a cross-sectional view taken along IV-IV line of FIG. 3.

Referring to FIG. 4, FIG. 4 is a cross-sectional view of FIG. 3 taken along IV-IV line. The four image compensating apparatuses 110 are set on a border of the display region 11 and adjacent to the non-display region 12. At the corner of the display region 11, two opposite ends of the image compensating apparatuses 110 are connected end to end via an inclined end surface to form a closed compensating frame. An included angel between the inclined end surface and a periphery of the display 100 is preferred to be 45 degree.

In this embodiment, the image compensating apparatus 110 is a triangular prism with a cross section shaped as an obtuse triangle. The support portion 120 is a prism with a side surface resisting again the image compensating apparatus 110. The image compensating apparatus 110 includes a light emitting surface 112, a light incident surface 113, and an inclined surface 114. In this embodiment, the light incident surface 113 is a bottom surface contacting with the display panel 10. The light emitting surface 112 inclines to the light incident surface 113. The light incident surface 113, the light emitting surface 112, and the inclined surface 114 are connected with each other. The light incident surface 113 and the inclined surface 114 from an obtuse triangle therebetween. The obtuse angle is preferred to be 135 degree. A projection of the light emitting surface 112 on the light incident surface 113 is greater than an area of the light incident surface 113.

The image compensating apparatus 110 includes a number of light guiding channels 111. In this embodiment, each of the light guiding channels 111 is a light guiding fiber. Because a light path of each light guiding fiber is independent from the light path of the other light guiding fiber, the light passing through each light guiding fiber do not disturb with the light passing through the other light guiding fiber. Each of the light guiding fibers extends from the light incident surface 113 to the light emitting surface 112. An extending direction of the light guiding fibers is parallel to the inclined surface 114. Each of the light guiding channels 111 extends along a substantially same direction. The light guiding channels 111 are arranged as a matrix.

In this embodiment, a width of the non-display region 12 is presented as W1. The bottom width of the support portion 120 is also W1. Both of a height of the support portion 120 and a height of the image compensating apparatus 110 are presented as W3. A bottom width of the image compensating apparatus 110 is presented as W2. The W2 is greater than the W1. Preferably, the W2 is a double of the W1. For example, when the W1 is 3 millimeters (mm), the W2 is 6 mm.

The display region 11 includes a number of pixels. Light from the pixels is enter the image compensating apparatus 110 via the light incident surface 113 and emits out from the light emitting surface 112. Because the projection of the light incident surface 112 on the display panel 10 is greater than the area of the light incident surface 113, an image of the display region 11 covered by the light incident surface 113 is transmitted to the light emitting surface 112 covering the non-display region 12. Thus, the non-display region 12 is invisible to a viewer. The display 100 has a frame-less effect.

Figure 5:
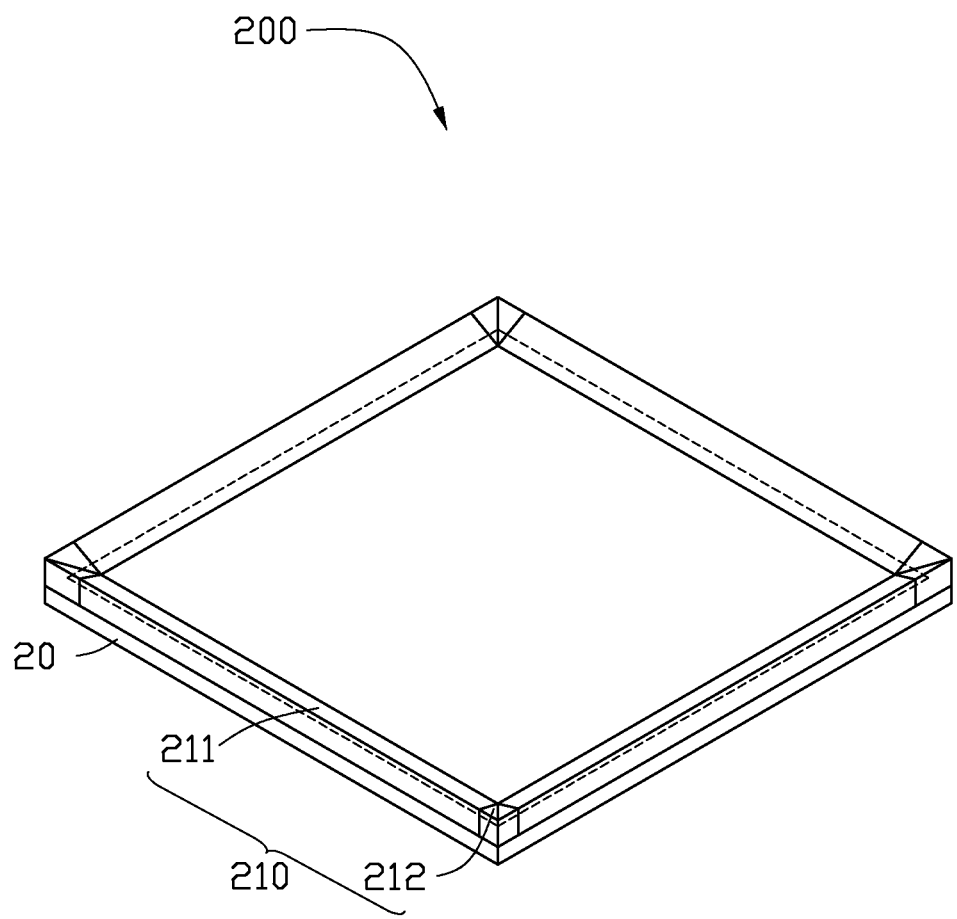
FIG. 5 is a schematic, isometric view of a second embodiment of a display of the present disclosure.

FIG. 5 is a schematic, isometric view of a second embodiment of a display 200. The display includes a display panel 20 and an image compensating apparatus 210 set on the display panel 20. A difference between the image compensating apparatus 210 of the second embodiment and the image compensating apparatus 110 of the first embodiment is that the image compensating apparatus 210 includes a number of elongated side image compensating apparatuses 211 and a number of corner image compensating apparatuses 212. A display effect of four corners of the display 200 is improved by the corner image compensating apparatuses 212.

Figure 6:
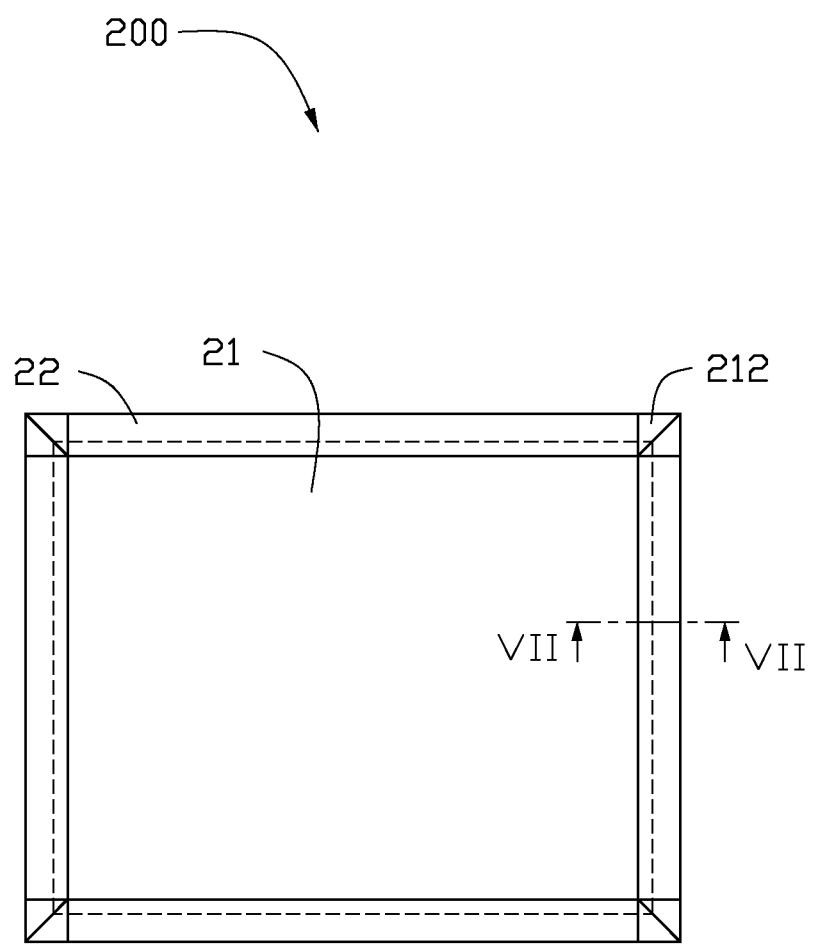
FIG. 6 is a top view of the display of FIG. 5.
Figure 7:
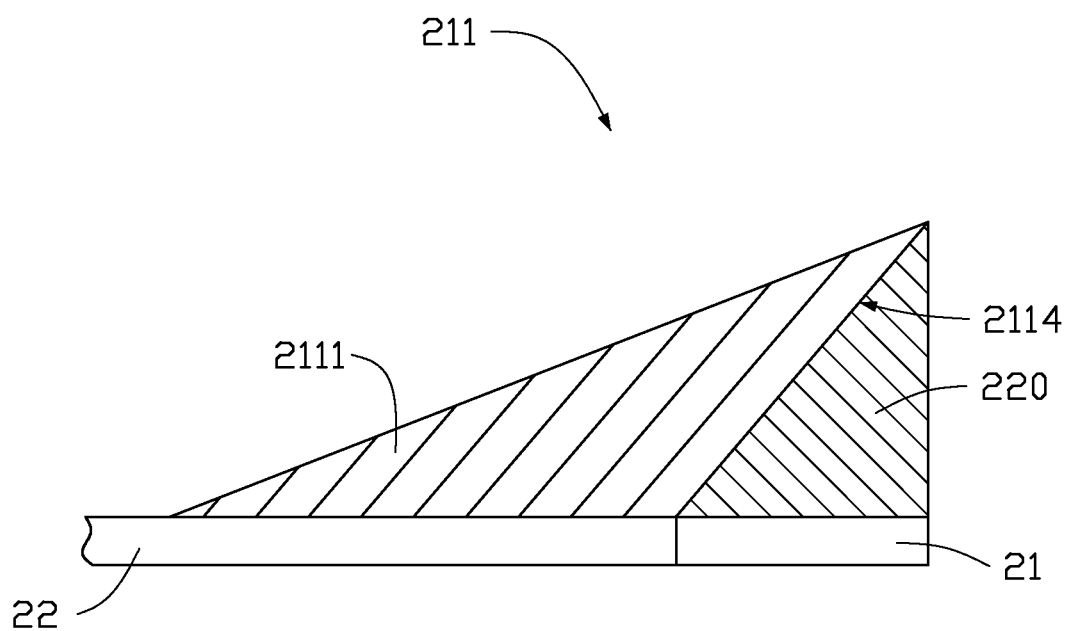
FIG. 7 is a cross-sectional view taken along VII-VII line of FIG. 6.

Referring to FIGS. 6 and 7, two adjacent side image compensating apparatuses 211 are connected via one of the corner image compensating apparatuses 212. Referring to a top view of FIG. 6, four side image compensating apparatuses 211 and four corner image compensating apparatuses 212 are alternatively connected end to end to form a rectangular closed frame. The corner image compensating apparatuses 212 are correspondingly located at four corner of the display region 21.

Referring to FIG. 7, the side image compensating apparatus 211 includes a number of light guiding channels 2111 arranged as a matrix. In this embodiment, each of the light guiding channels 2111 is a light guiding fiber with an even diameter. The light guiding channels 2111 extend from the light incident surface 213 to the light emitting surface 214. The light guiding channels 2111 are parallel to the inclined surface 114. A light from the display region 21 enters the image compensating apparatus 210 from the light incident surface 213 and emits out of the image compensating apparatus 210 by passing through the light guiding channels 2111. Thus, the viewer can see the image on the light emitting surface 214.

Figure 8:
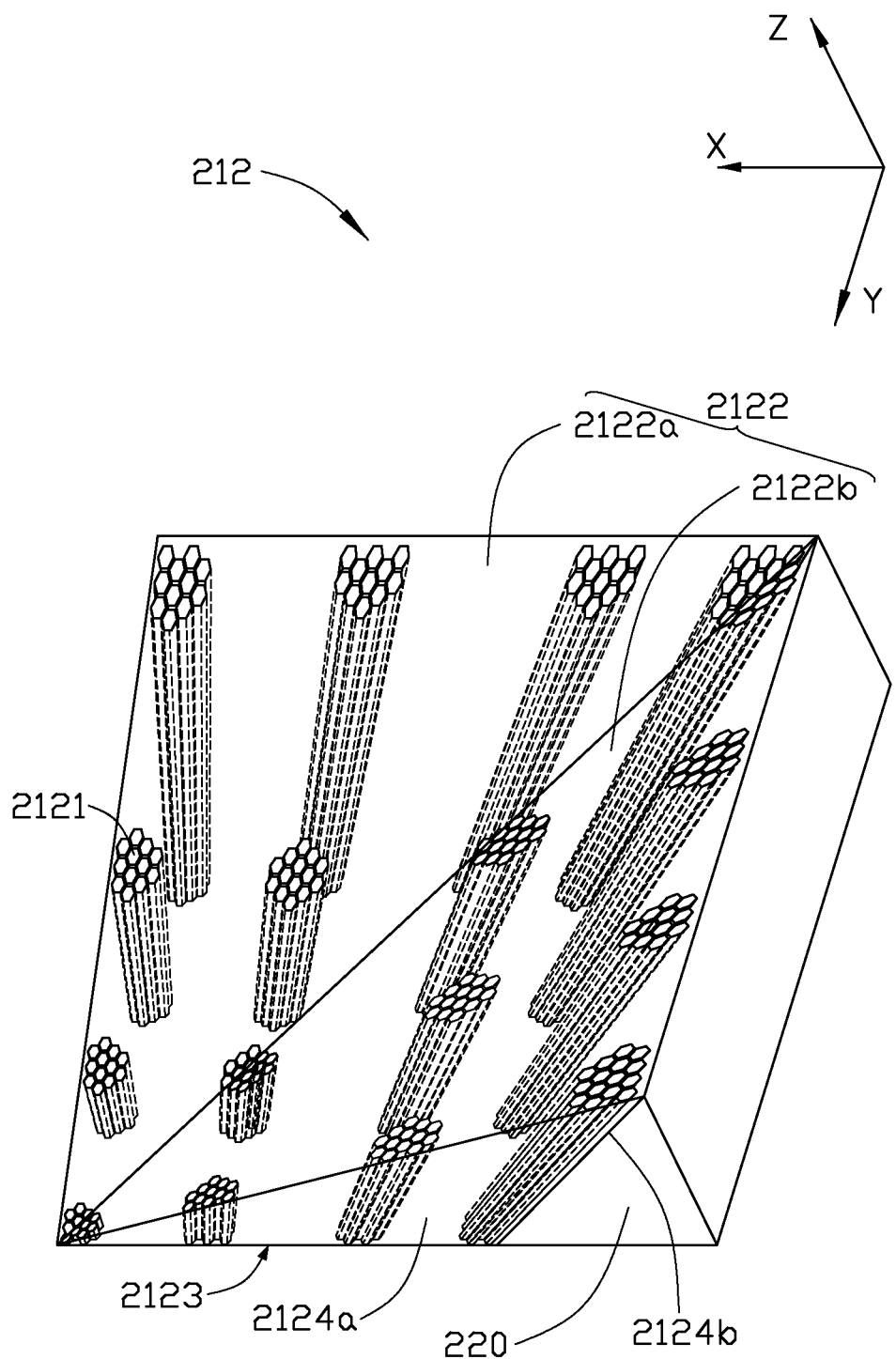
FIG. 8 is a schematic, isometric view of a corner image compensating apparatus.
Figure 9:
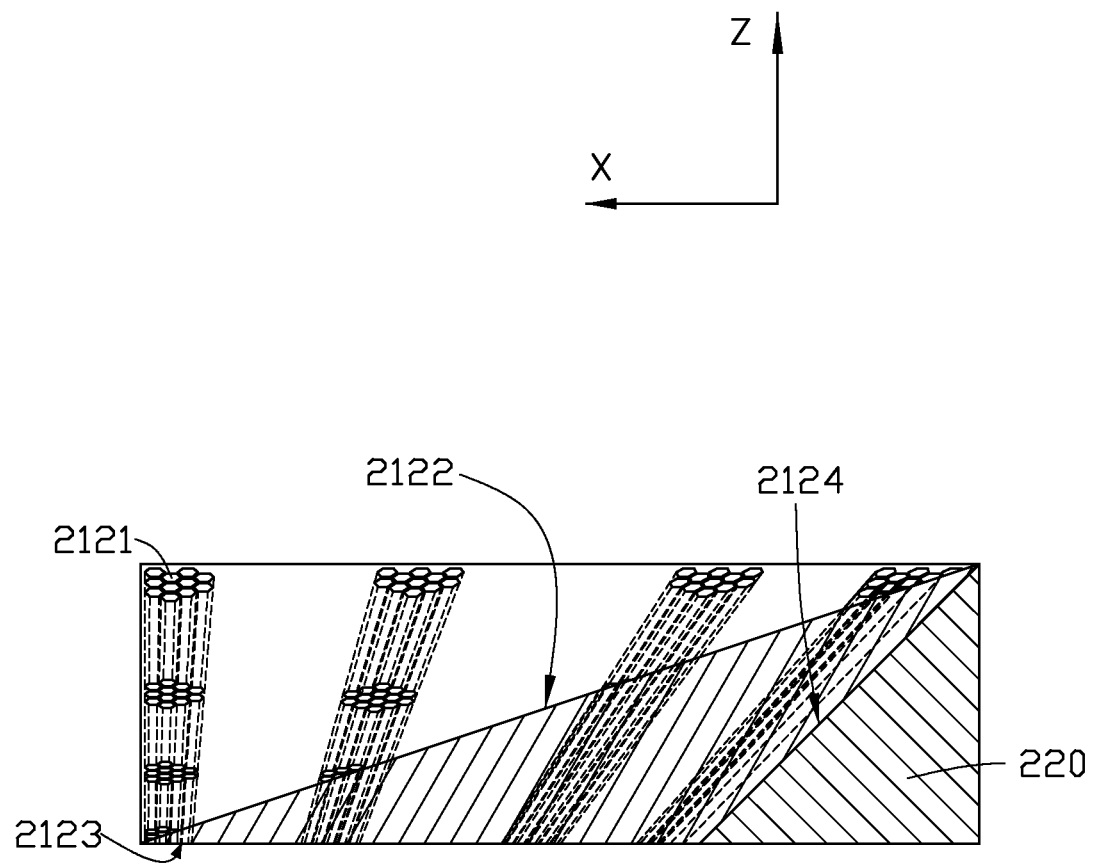
FIG. 9 is a front view of the corner image compensating apparatus.

Referring to FIGS. 8 and 9, each of the corner image compensating apparatuses 212 includes a light output surface 2122, a light input surface 2123, and a sloping surface 2124. The light input surface 2122 includes a pair of interconnecting sub-output surfaces 2122a and 2122b. Preferably, the sub-output surface 2122a is not coplanar with the other sub-output surface 2122b. In this embodiment, the pair of the sub-output surfaces 2122a and 2122b forms an included obtuse angle. In this embodiment, the light input surface 2123 is a bottom surface of the image compensating apparatus 210 contacting with the display region 21. The sloping surface 2124 includes a pair of interconnecting sub-surfaces 2124a and 2124b. The sloping surface 2124 correspondingly connects with the light output surface 2122 and the light input surface 2123. The sub-output surfaces 2122a and 2122b are inclined to the light input surface 2123. The sub-surfaces 2124a and 2124b correspondingly form an obtuse angle with the light input surface 2123. Preferably, the obtuse angle is 135 degree.

Figure 10:
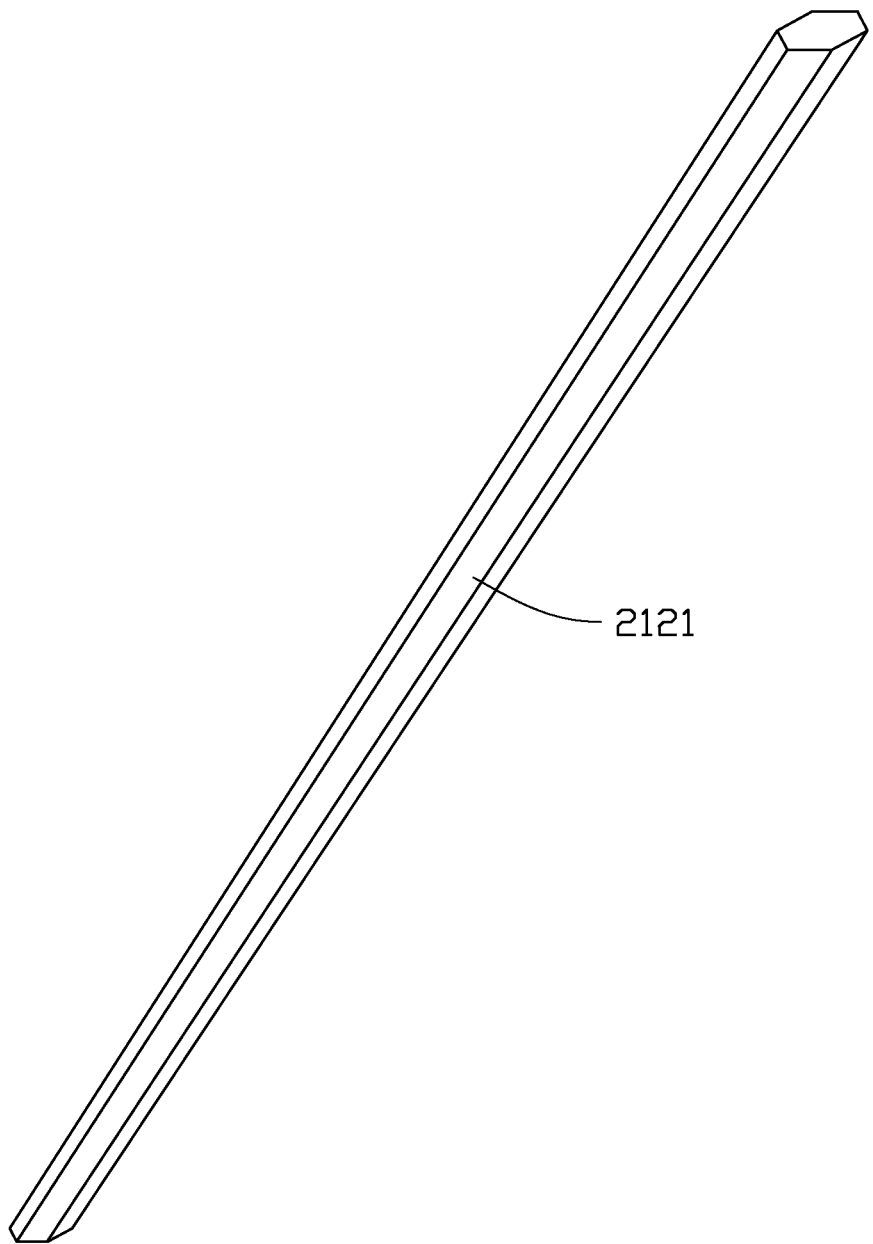
FIG. 10 is a schematic, isometric view of a light guiding fiber.

Each of the corner image compensating apparatus comprises a number of light guiding channels 2121. Each of the light guiding channels 2121 is combined with a number of alveolate light guiding fibers. The light guiding fibers extends from the light input surface 2123 to the sub-output surfaces 2122a and 2122b. A diameter of the light guiding fibers of the corner image compensating apparatus 211 gradually increases in the extending direction. In detail, referring to a coordinate system of FIG. 8, when the light guiding fiber extends along a Z axis, radius of the light guiding fiber in X axis and Y axis are gradually increased. Also referring to FIG. 10, a cross-sectional area of the light guiding fiber gradually increases in the extending direction.

Because the projection of the light output surface 2122 on the display panel 20 is greater than the area of the light input surface 2123, an image of the display region 21 covered by the light input surface 2123 is transmitted to the light output surface 2122 covering the non-display region 22. Thus, the non-display region 22 is invisible to a viewer. The display 200 has a frame-less effect.

Figure 11:
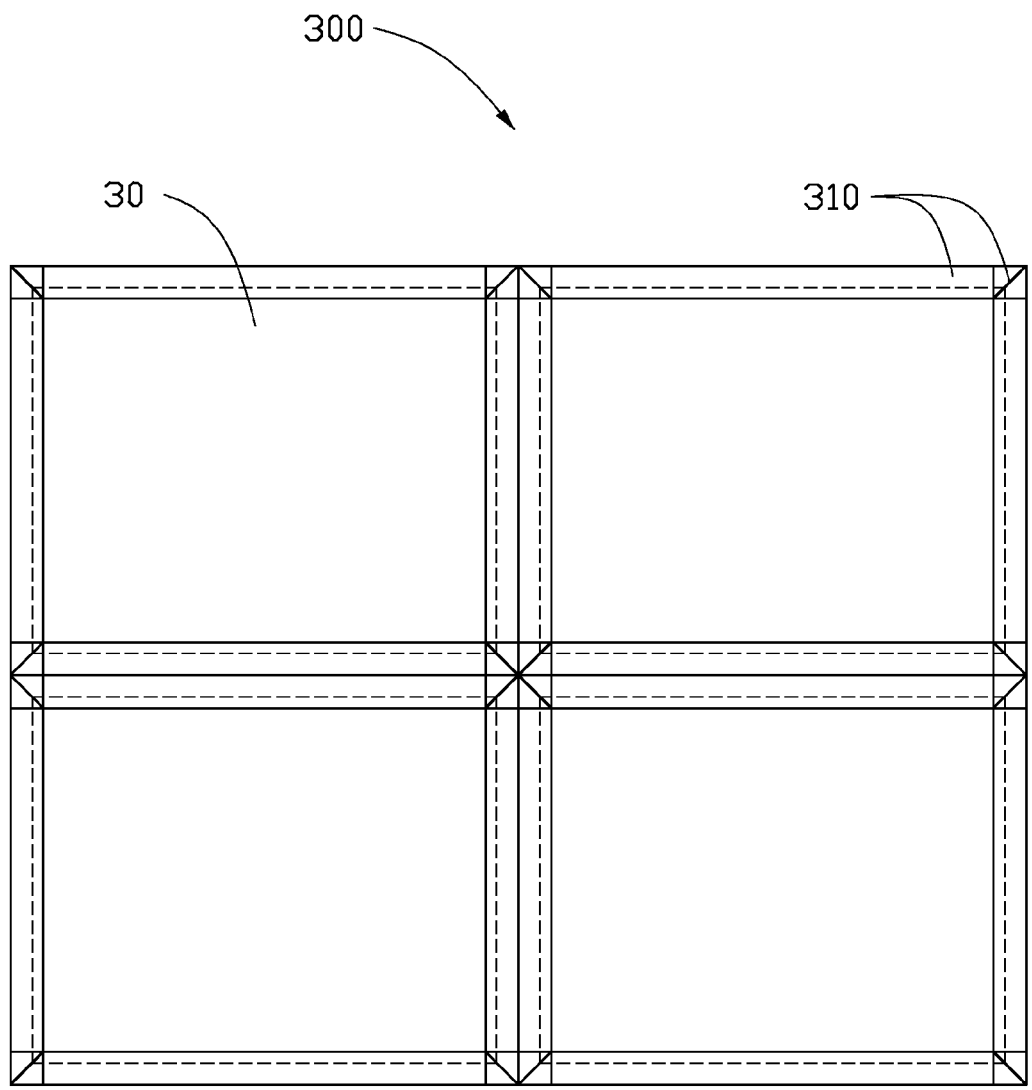
FIG. 11 is a schematic, exploded view of a first embodiment of a joint display.

Referring to FIG. 11, the image compensating apparatus 310 can be employed in a joint display 300. The image compensating apparatuses 310 are set at a number of connecting seams between adjacent display panels 30 arranged as matrix. A frame-less effect of the display 300 is realized by the image transmitting function of the image compensating apparatuses 310.

In the other alternative embodiments of the present disclosure, the display 200 can be, but is not limited to, a liquid crystal display panel and a plasma display panel. The shape of the image compensating apparatus 310 can be changed according to the shape of the display 300. The light input surface 2123 could be parallel to the light output surface 2122. For example, a cross-section of the image compensating apparatus 310 is a isosceles trapezoid. The light output surface 2122 is a top surface of the isosceles trapezoid and the light input surface 2123 is a bottom surface of the isosceles trapezoid. The light guiding channel 2111 is combined with a number of light guiding thin plates, silica fibers, glass fibers, or the other light penetrating material. In the other embodiment, the support portion is omitted. The image compensating apparatus 310 is fastened to the display panel 30 via glue or the other fastener.

Figure 12:
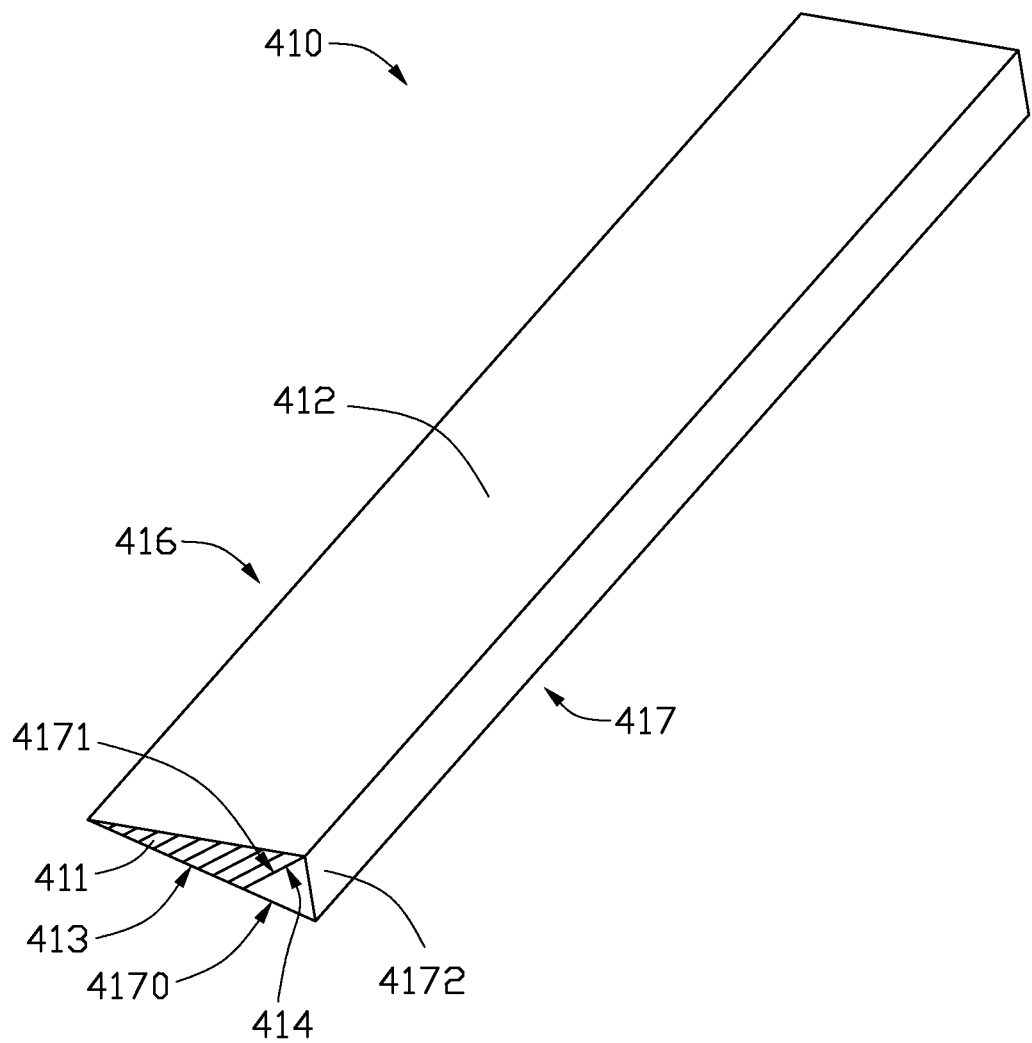
FIG. 12 an isometric view of a first embodiment of an image compensating apparatus, the image compensating apparatus including a plurality of light guiding fibers.

FIG. 12 shows an isometric view of a first embodiment of an image compensating apparatus 410. The image compensating apparatus 410 is similar to the image compensating apparatus 110 of FIGS. 2 and 4, and similar to the periphery image compensating apparatus 211 of FIGS. 5 and 7. Therefore, all of above-descried referring to the periphery image compensating apparatus 110, 211 may be suited to the image compensating apparatus 410.

The compensating apparatus 410 defines a light incident surface 413, a light emitting surface 412 connected to an edge of the light incident surface 413, and a plurality of light guiding channels 411 extending from the light incident surface 413 to the light emitting surface 412. An area of a projection of the light emitting surface 413 on the light incident surface 412 is greater than that of the light incident surface 412, such that a light beam introduced into the light incident surface 412 is transmitted and extended to the light emitting surface 413. Extending directions of the plurality of light guiding channels 411 are substantially parallel to each other, and the plurality of light guiding channels 411 are arranged side by side. In the embodiment, the light guiding channels 411 are defined by light guiding fibers 415.

Because the extending direction of each light guiding channel 411 is independent from each other, the guiding directions of the plurality of guiding channels 411 are independent from each other without interference.

Figure 13:
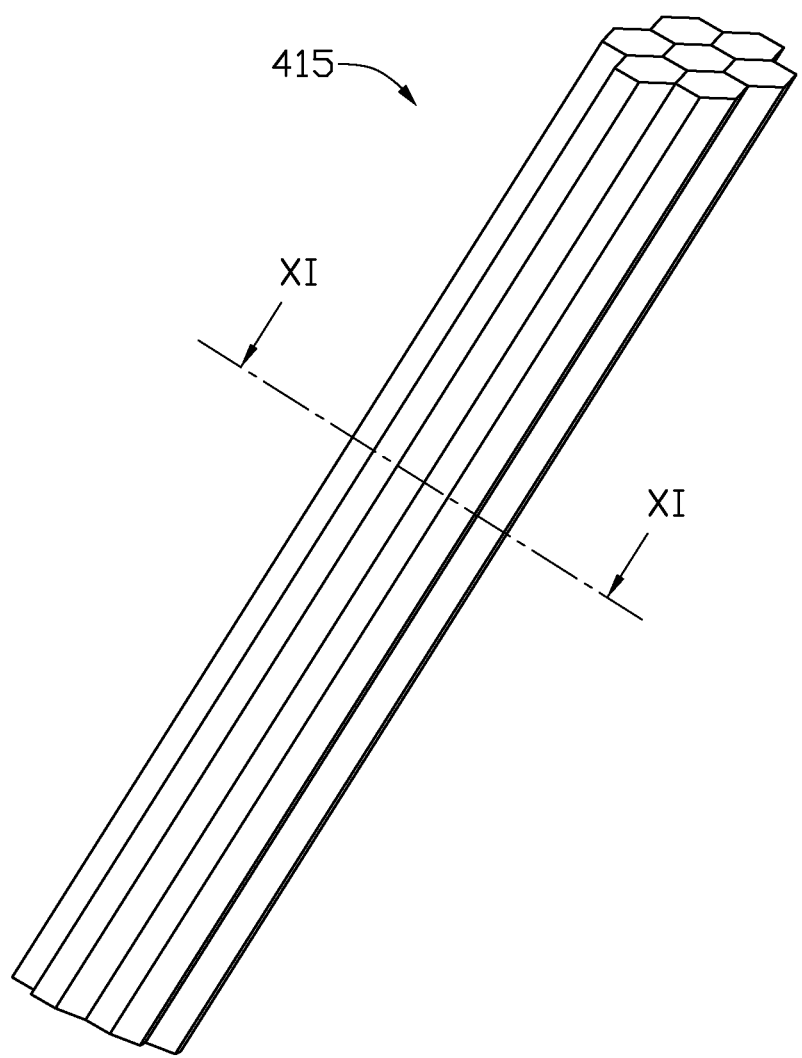
FIG. 13 is an enlarged, isometric view of tightly arranged light guiding fibers of the image compensating apparatus in FIG. 12.

Extending directions of the light guiding fibers 415 are substantially parallel to each other, and the light guiding fibers 415 are arranged in a bunch. FIG. 13 shows an enlarged, isometric view of tightly arranged light guiding fibers 415 of the image compensating apparatus 410 of FIG. 12. A cross section area of each light guiding fiber 410 is substantially in a hexagon shape. Side surfaces of each light guiding fiber 415 are combined to side surfaces of the light guiding fibers 415 arranged around the light guiding fiber 415, thereby forming a light guiding element including a plurality of light guiding fiber 415 arranged in a bunch. When the light guiding channels of the image compensating apparatus 110 of FIG. 2 are defined by light guiding fibers 415, the detail structure of light guiding fibers 415 is same as shown in FIG. 13.

Figure 14:
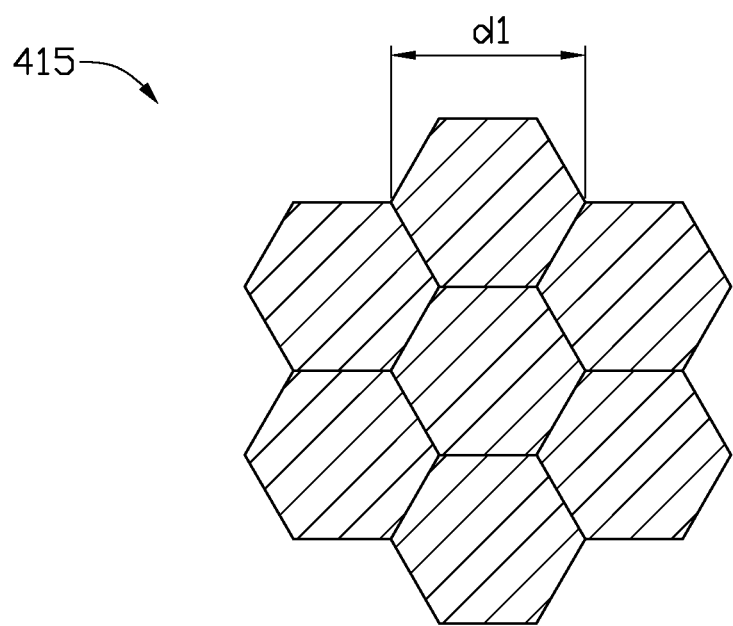
FIG. 14 is a cross-sectional view of the light guiding fibers 415 in FIG. 13, taken along XI-XI.

FIG. 14 shows a cross-sectional view of the light guiding fibers 415 of FIG. 13 along a direction perpendicular to extending directions of the light guiding fibers 415. The cross section area of each light guiding fiber 415 is hexagon, an outline diameter d1 is defined between opposite end points of the cross section area of each light guiding fiber 415. The outline diameter d1 of each light guiding fiber 415 gradually increases from the light incident surface 413 toward the light emitting surface 412. The diameter d1 of each light guiding fiber 415 may be changed according to a requirement. In one embodiment, the diameters d1 of the light guiding fiber 415 may be 5 um.

Referring to FIG. 12 again, in the embodiment, the light incident surface 413 and the light emitting surface 412 are planar surfaces, and intersects with each other. The image compensating apparatus 410 further defines an inclined surface 414 interconnecting the light incident surface 413 and the light emitting surface 412. The inclined surface 414 is inclined to the light incident surface 413. The inclined surface 414 and the light incident surface 413 may define an obtuse angle, such as 135 degrees. The light incident surface 423 and the light emitting surface 412 may define an acute angle, such as 18.4 degrees. In the embodiment, the image compensating apparatus 410 is a triangular prism, and bounded by the light incident surface 423, the light emitting surface 412, and the inclined surface 414 as side surfaces.

The compensating portion 416 of the image compensating apparatus 410 may be defined by the plurality of light guiding channels 411. The image compensating apparatus 410 may include a detachable support portion 417 combined to the inclined surface 414. The support portion 417 is employed to support the compensating portion 416, and the image compensating apparatus 410. The support portion 417 has a height equal to that of the compensating portion 416, a bottom of the support portion 417 is coplanar to the light incident surface 413. In detail, the support portion 417 is substantially triangular prism, and defines a supporting surface 4171, a bottom surface 4170, and a connecting surface 4172. The supporting surface 4171 is combined to the inclined surface 414. The bottom surface 4170 is coplanar to the light incident surface 413. The connecting surface 4172 interconnects the supporting surface 4171 and the bottom surface 4170. In one embodiment, a cross section area of the support portion 417 is an isosceles right triangle. The bottom surface 4170 is perpendicular to the connecting surface 4172. The support portion 417 may be made of glass. In one substituted embodiment, the image compensating apparatus 410 does not include the support portion 417, it merely comprises the compensating portion 426 with the plurality of light guiding channel 411.

Figure 15:
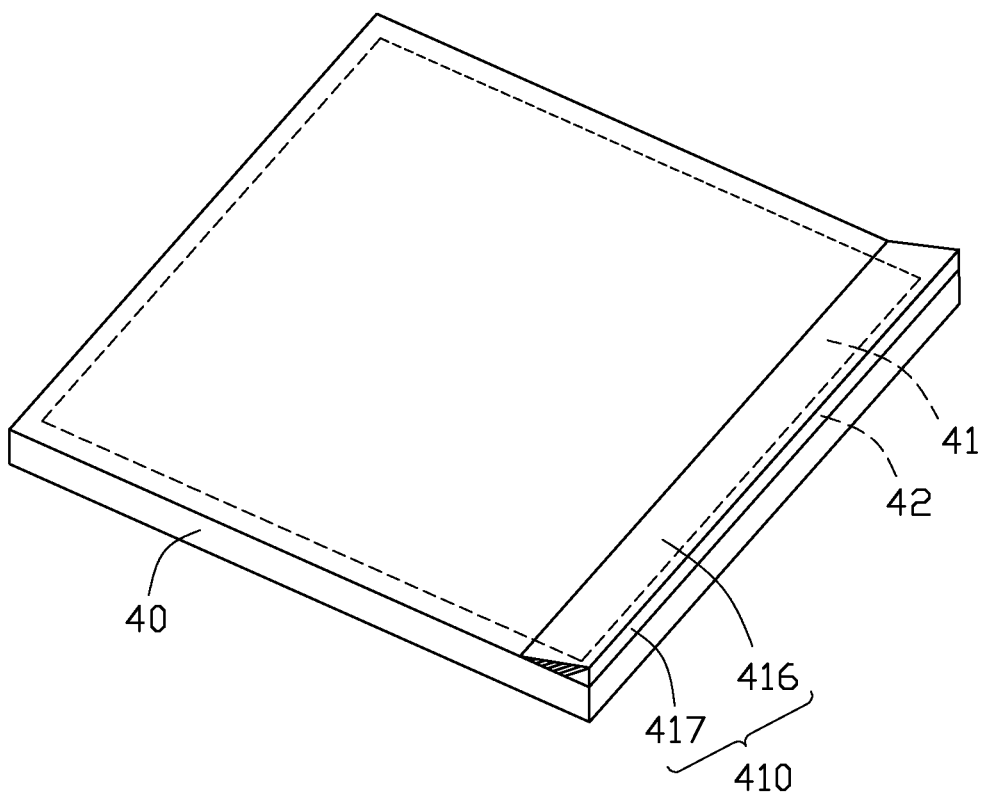
FIG. 15 is an isometric view of the image compensating apparatus upon a display panel.
Figure 16:
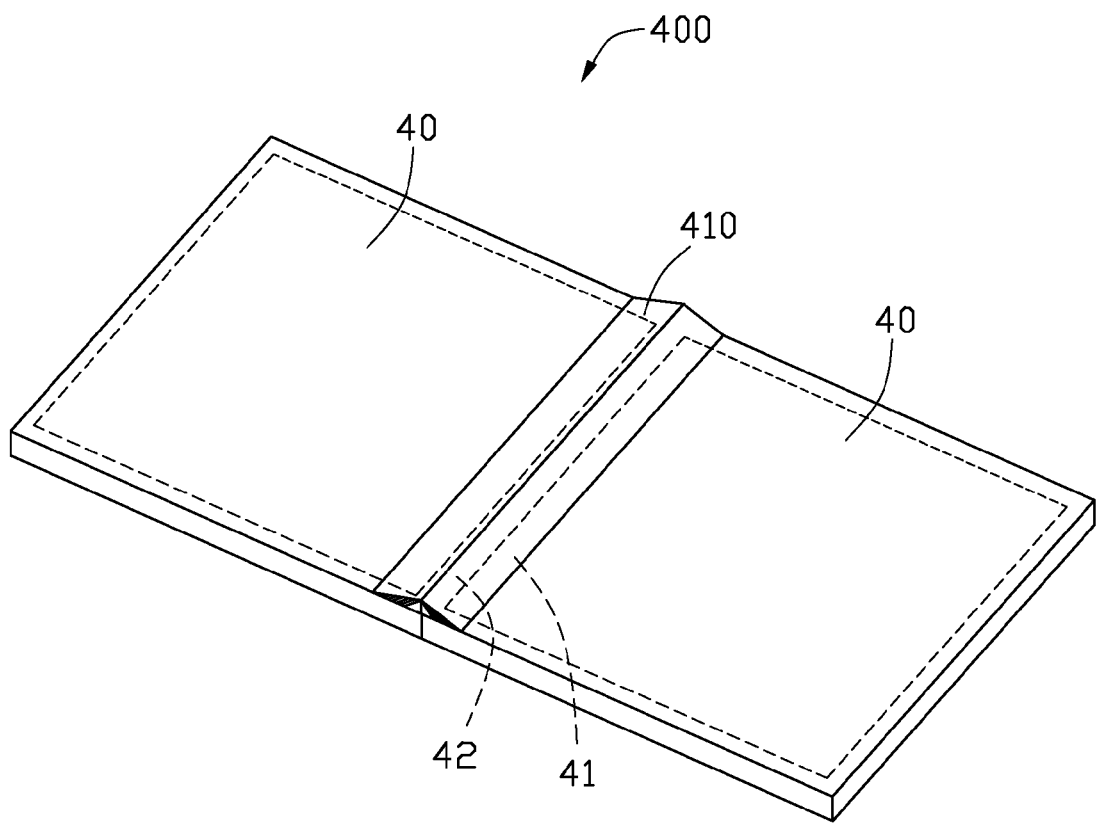
FIG. 16 is a display assembly jointed from two display panels of FIG. 15.

FIG. 15 shows an isometric view of the image compensating apparatus 410 disposed upon a display panel 40. The compensating portion 416 of the image compensating apparatus 410 is disposed on a periphery display region 41 of the display panel 40, and adjacent to an edge of the non-display region 42. The compensating portion 416 is configured for introducing image from the periphery display region 41 and displaying the image thereon, thereby covering the non-display region 42. The support portion 417 may be disposed upon the non-display region 42 and supporting the compensating portion 416. The sizes of the compensating portion 416 and the support portion 417 may be adjusted according to a requirement of the display panel 40. In one embodiment, the widths of the compensating portion 416, and the light incident surface 413 is about 10 millimeters. The area of the inclined surface 414 is equal to that of the supporting surface 4171. The widths of the bottom surface 4170, and the connecting surface 4172 may be 5 millimeters. Preferably, the image compensating apparatus 410 may be disposed on the display panel 40 having non-display regions 42 (border region) with width 5 millimeters, such that a light beam introduced from the periphery display region 41 is transmitted and extended to the compensating portion 416, and completely covers the non-display regions 42, thereby displaying image on the display panel 40 without lattice edge. FIG. 16 shows a display assembly 400 jointed from two display panels 40, the image compensating apparatus 410 of the two display panels 40 are disposed on jointing portion of the two display panels 40. The image introduced from the periphery display region 41 is displayed on the image compensating apparatus 410 and covers the non-display regions 42 (border region) to accomplish a seamless splice or no black-edge splice of the two display panels 40. The displaying quality of the display assembly 400 is greatly enhanced. The image compensating apparatus 410 employed in the display panel 40 enables a plurality of display panel 40 to be spliced in a plane without reducing a displaying quality.

Figure 17:
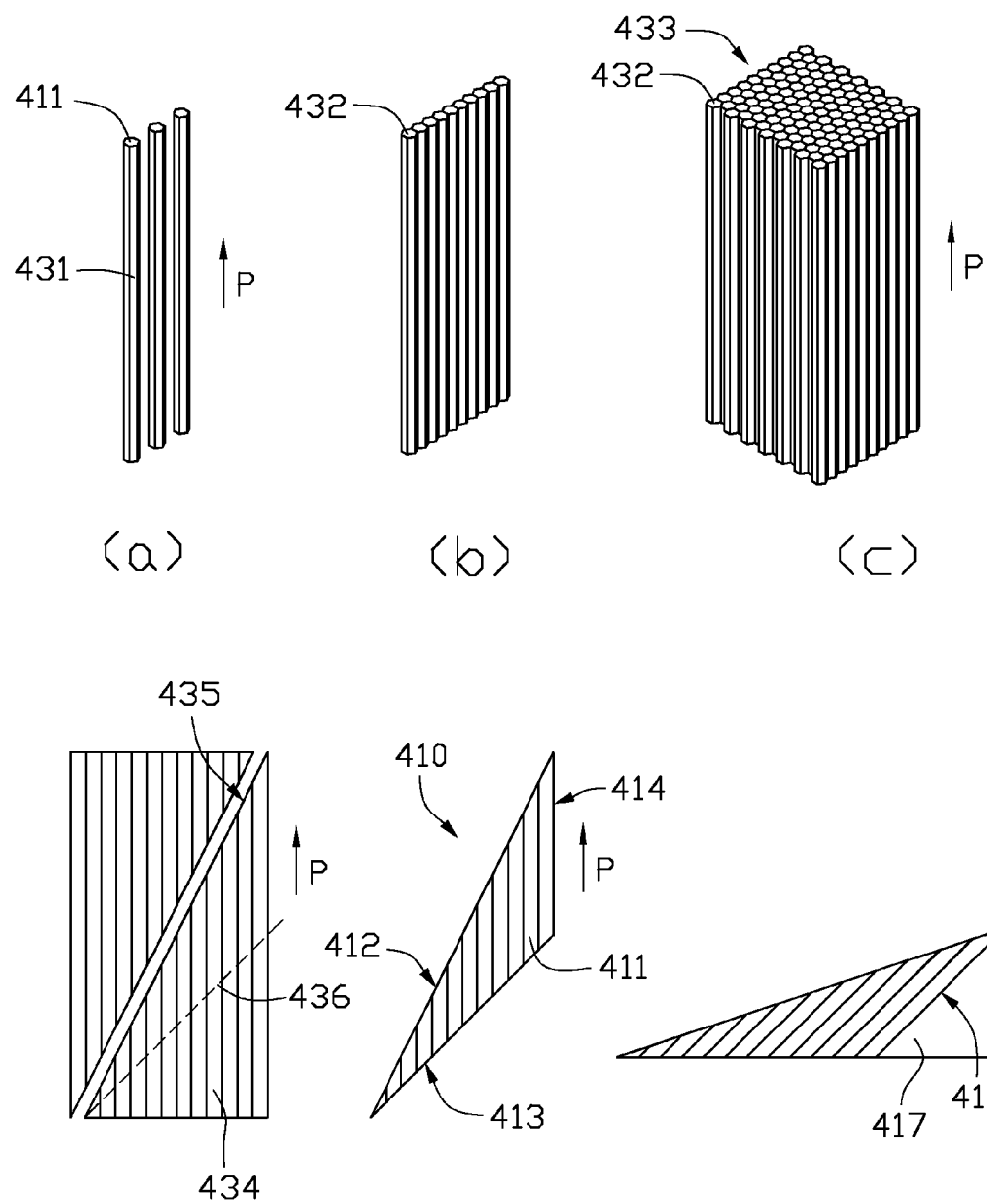
FIG. 17 is a schematic diagram of steps of a first embodiment of a manufacturing method for manufacturing the image compensating apparatus of FIG. 12.
Figure 18:
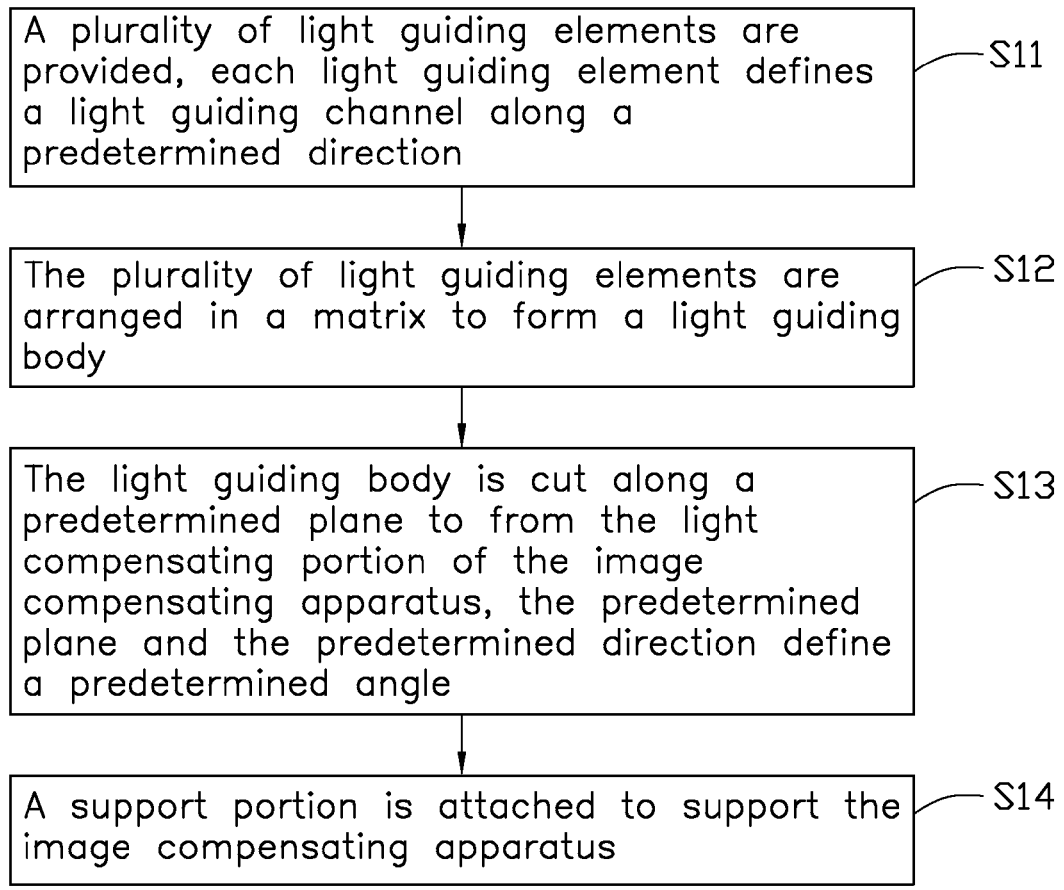
FIG. 18 is a flow chart of the manufacturing method of FIG. 17.

FIG. 17 is a schematic diagram of steps of a first embodiment of a manufacturing method for manufacturing the image compensating apparatus 410. FIG. 18 is a flow chart of the manufacturing method of FIG. 17.

The steps of the manufacturing method of the image compensating apparatus 410 includes steps as S11-S14. FIGS. 17(a), 17(b), 17(c) are isometric views, FIGS. 17(d), 17(e), 17(f) are side views, one skilled in the art can easily understand.

Referring to FIG. 17(a), in step S11, a plurality of light guiding elements 431 are provided, each light guiding element 431 defines a light guiding channel 411 along a predetermined direction P. In detail, the light guiding elements 431 are defined by light guiding fibers, such as optical fibers. Cross section area of each light guiding channel 411 remains constant.

Referring to FIG. 17(b)-(c), in step S12, the plurality of light guiding elements 431 are arranged in a matrix to form a light guiding body 433. In detail, the plurality of light guiding elements 431 are divided into a number of groups each arranged in single layer/two layers/a plurality of layers types, to form a plurality of light guiding films 432. The plurality of light guiding films 432 are laminated or adhered together in high temperature to form the light guiding body 433. In the embodiment, the light guiding body 433 is substantially cuboid. The predetermined direction P is perpendicular to a top surface and a bottom surface of the cuboid as same as the light guiding body 433.

Referring to FIG. 17(d)-(e), in step S13, the light guiding body 433 is cut along a predetermined plane to from the light compensating portion 416 of the image compensating apparatus 410, the predetermined plane and the predetermined direction P define a predetermined angle. The compensating apparatus 410 defines an light incident surface 413, a light emitting surface 412 connected to an edge of the light incident surface 413, and an inclined surface 414 connected to the light incident surface 413 and the light emitting surface 412. The light guiding channel 411 extends from the light incident surface 413 to the light emitting surface 412. An area of a projection of the light emitting surface 413 on the light incident surface 412 is greater than that of the light incident surface 412.

In detail, the step S13 may includes: the light guiding body 433 is cut along a first cutting plane 435 defined by diagonal lines of a pair of symmetrical side surfaces of the light guiding body 433, thereby obtaining a tri-prism light guiding element 434. The tri-prism light guiding element 434 is cut along a second cutting plane 436 connecting with the first cutting plane 435, thereby obtaining the compensating portion 416 of the image compensating apparatus 410. The second cutting plane 436 and the first cutting plane 435 define an angle. When the image compensating apparatus 410 does not include the supporting portion 417, when the step S13 is completed, the manufacturing method of the image compensating apparatus 410 is accomplished.

Referring to FIG. 17(f), in step S14, a support portion 417 is attached to support the image compensating apparatus 410. In detail, the support portion 417 is combined to the inclined surface 414 by adhering or lamination in high temperature. The support portion 417 may be made of glass.

Figure 19:
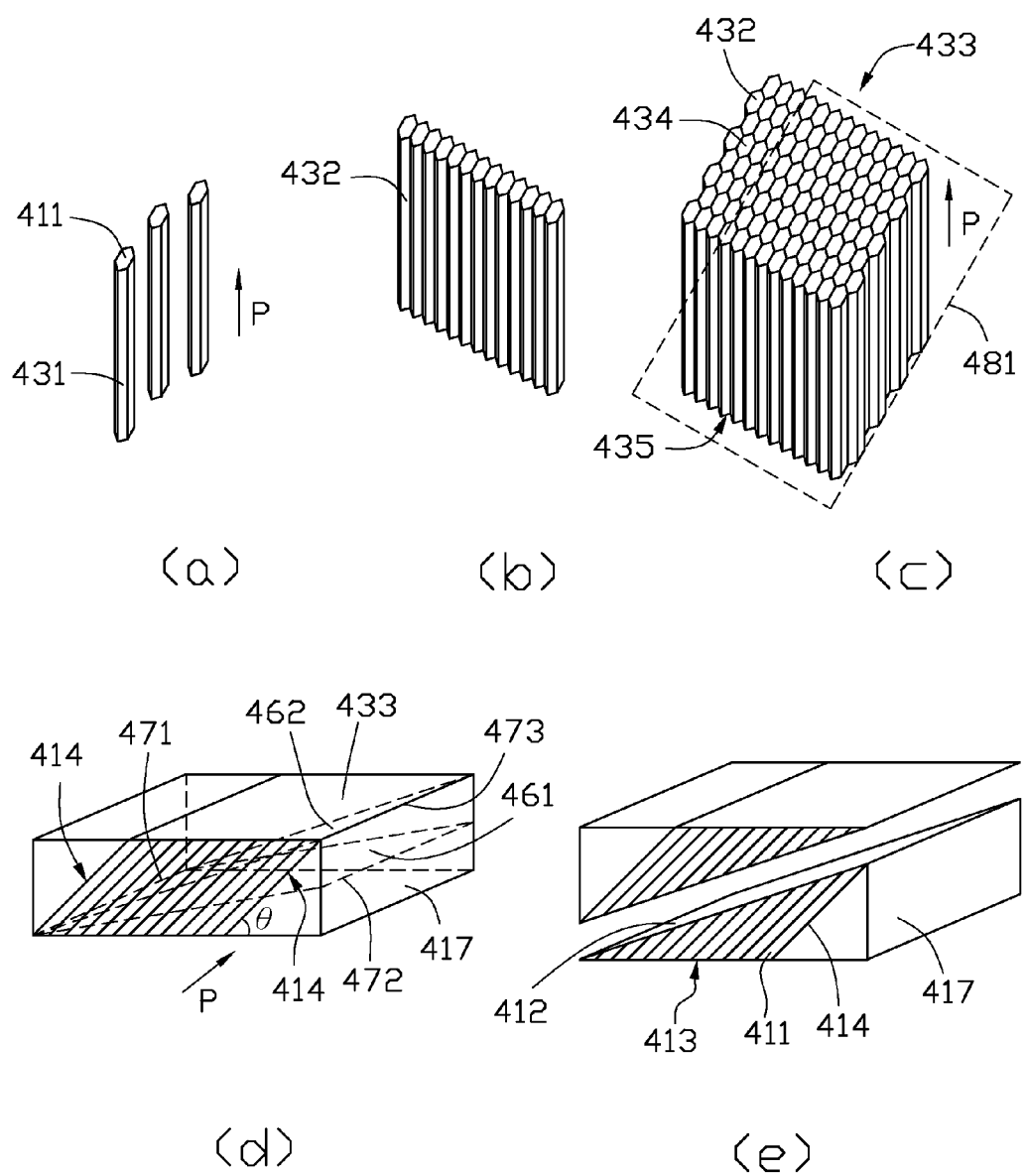
FIG. 19 is a schematic diagram of steps of a second embodiment of a manufacturing method for manufacturing the image compensating apparatus of FIG. 12.
Figure 20:
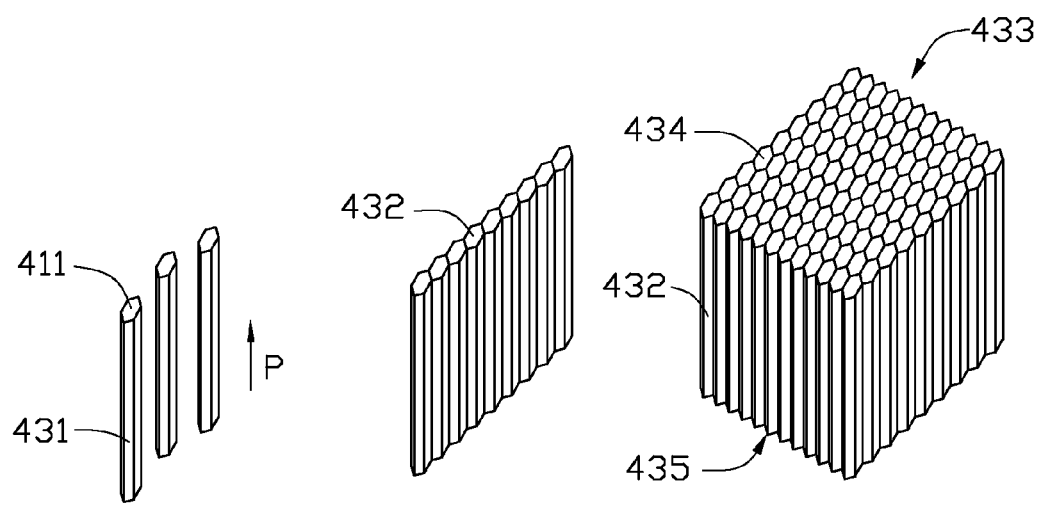
FIG. 20 is a schematic diagram of steps of a second embodiment of a manufacturing method similar to FIG. 19.
Figure 20:
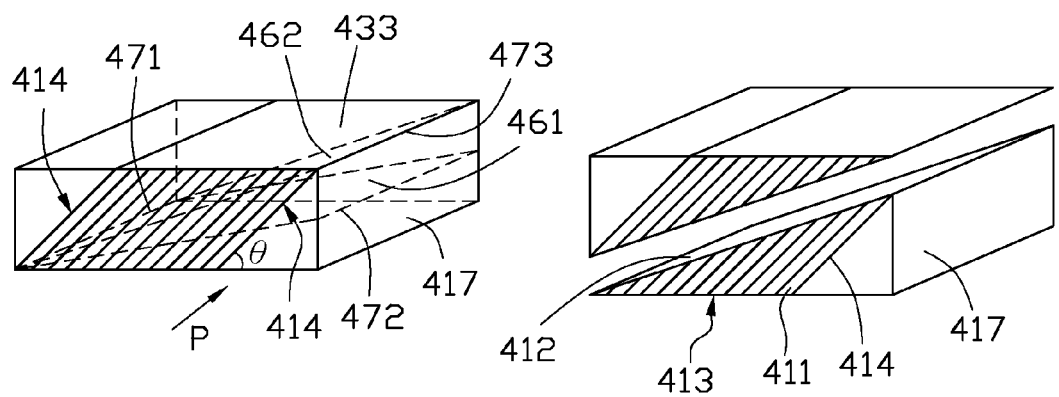
Figure 21:
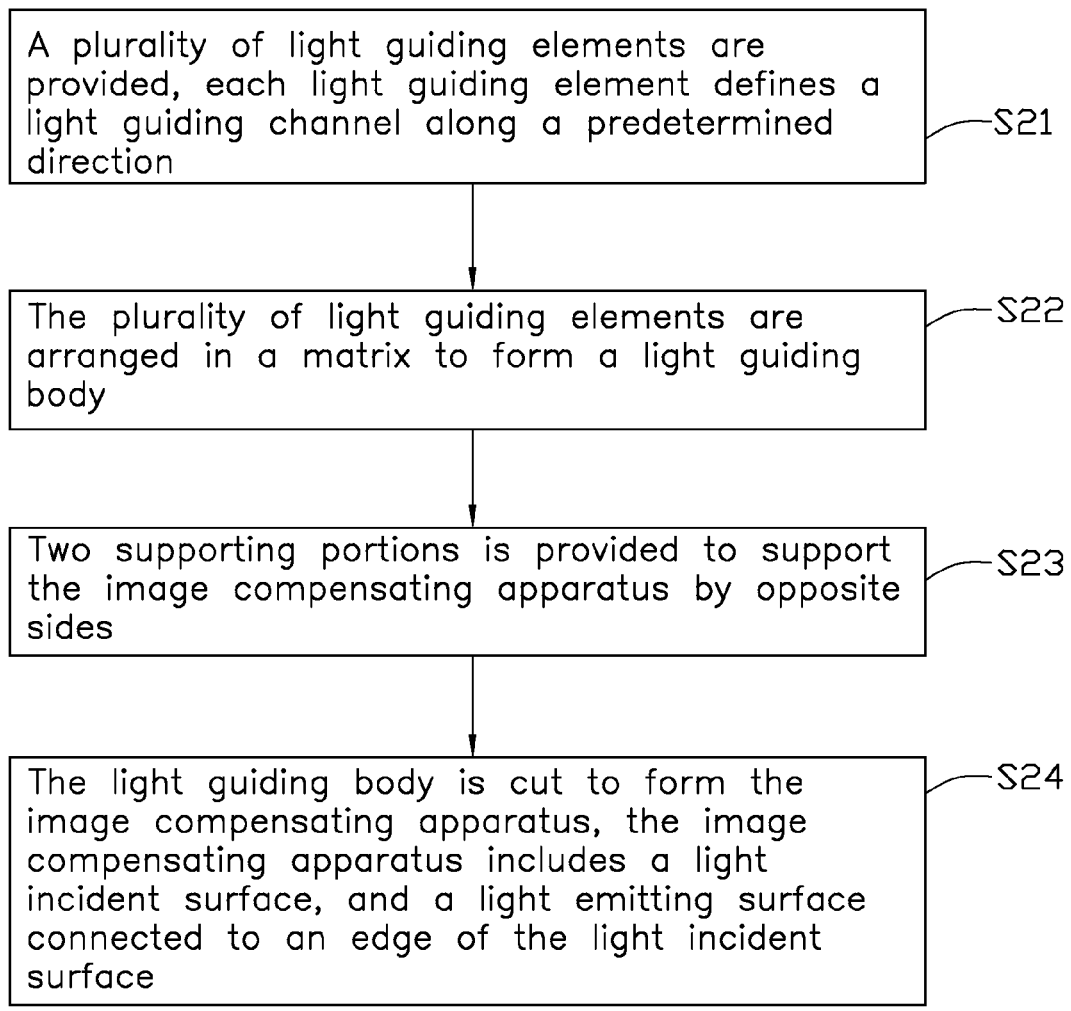
FIG. 21 is a flow chart of the manufacturing method of FIG. 19

Referring to FIGS. 19 through 21, FIG. 19 is a schematic diagram of steps of a second embodiment of the manufacturing method for manufacturing the image compensating apparatus 410 of FIG. 12. FIG. 20 is a schematic diagram of steps of a second embodiment of the manufacturing method similar to FIG. 19. FIG. 21 is a flow chart of the manufacturing method of FIG. 19. The manufacturing method for manufacturing the image compensating apparatus 410 includes steps as follow step 21 step 24.

Referring to FIG. 19(a), in step 21, a plurality of light guiding elements 431 are provided, each light guiding element 431 defines a light guiding channel 411 along a predetermined direction P. In detail, the light guiding elements 431 are defined by light guiding fibers.

Referring to FIGS. 19(b)-(c) and 20 (b)-(c), in step S22, the plurality of light guiding elements 431 are arranged in a matrix to form a light guiding body 433. In detail, in step S22, the plurality of light guiding elements 431 are divided in a number of groups each arranged in single layer/two layers/a plurality of layers types, to form a plurality of light guiding films 432. The plurality of light guiding films 432 is laminated and adhered together in high temperature to form the light guiding body 433. In the embodiment shown in FIGS. 19(b)-(c), the light guiding film 432 is substantially rectangular. A bottom end of each light guiding film 432 is located on a plane 481, the next light guiding film 432 is located at a position higher than the light guiding film 432 in a vertical direction. The light guiding body 433 is substantially parallelepiped. The plane 481 and the predetermined direction P define an acute angel. In FIGS. 20(b)-(c), in the substituting embodiment, each light guiding film 432 is substantially parallelogram, a bottom end of each light guiding film 432 is located on a plane 481, the next light guiding film 432 is arranged at a side of the light guiding film 432 with the bottoms of the two light guiding films 432 arranged at a same vertically height. The top surface 434, the bottom surface 435, the front surface 414, and the rear surface 414 of the light guiding body 433 are substantially rectangular. The pair of side surfaces of the light guiding body 433 is parallel to each other and substantially parallelogram.

Also referring to FIGS. 19(d) and 20(d), in step 23, two supporting portions 417 is provided to support the image compensating apparatus 410 by opposite sides. In detail, the two supporting portions 417 are respectively combined to the front surface 414 and the rear surface 414 of the light guiding body 433 to form a cuboid. The two supporting portions 417 may be combined to the front surface 414 and the rear surface 414 by adhering or lamination in high temperature. In the embodiment, the support portion 417 is made of glass.

Also referring to FIGS. 19(e) and 20(e), in step 24, the light guiding body 433 is cut to form the image compensating apparatus 410, the image compensating apparatus 410 includes a light incident surface 413, and a light emitting surface 412 connected to an edge of the light incident surface 413. The light guiding channel 411 extends from the light incident surface 413 to the light emitting surface 412. An area of a projection of the light emitting surface 413 on the light incident surface 412 is greater than that of the light incident surface 412. In the embodiment, the light guiding body 433 is cut along two planes (461, 462), each of the two planes (461, 462) and the predetermined direction P define an angle. The plane 461 is defined by a bottom edge 471, and a top edge 473 of the light guiding body 433, the bottom edge 471 is located at a bottom side of the front surface 414 of light guiding body 433, the top edge 473 is parallel and opposite to the bottom edge 471, and located at a top side the rear surface 414 of light guiding body 433. The plane 462 is defined by the bottom edge 471, and a middle line 472 of a surface of the support portion 417 opposite to bottom edge 471, the surface is opposite to the rear surface 414. In a preferred embodiment, the plane 461 is defined by diagonal lines of a pair of symmetrical side surfaces of the light guiding body 433. In steps S13 and S24, the cutting way may be determined by a requirement, such as cutting opposite ends of the image compensating apparatus 410 obtained in steps S13 or S24 to form an image compensating apparatus 410 of FIGS. 1 and 2. The angle defined by the plane 461 and the predetermined direction P may be adjusted according to an area of the non display region.

Figure 22:
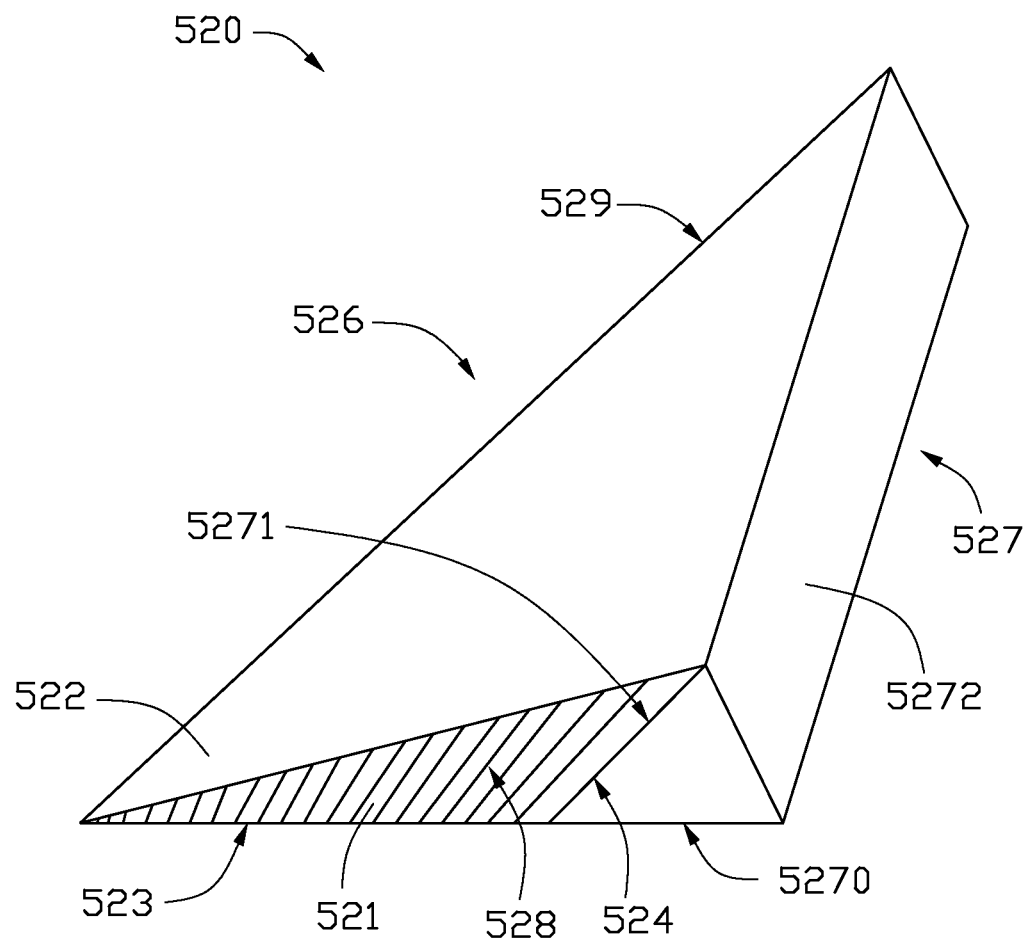
FIG. 22 is an isometric view of a second embodiment of an image compensating apparatus, the image compensating apparatus including a plurality of light guiding fibers.

FIG. 22 show an isometric view of an image compensating apparatus 520 manufactured by the second embodiment of the manufacturing method. The image compensating apparatus 520 is similar to the periphery image compensating apparatus 212 of FIGS. 5, and 8-10, therefore, all of above descried referring to periphery image compensating apparatus 212 may be suited to the image compensating apparatus 520.

The image compensating apparatus 520 defines an light incident surface 523, a light emitting surface 522 connected to an edge of the light incident surface 523, and a plurality of light guiding channels 521. An area of a projection of the light emitting surface 522 on the light incident surface 523 is greater than that of the light incident surface 523. The plurality of light guiding channels 411 are separated from each other and extends from the light incident surface 523 to the light emitting surface 522. An area of cross section area of each light guiding channel 521 increases gradually from the light incident surface 523 to the light emitting surface 522, thus a light beam introduced into the light incident surface 523 is transmitted and expanded to the light emitting surface 522 via the light guiding channel 521. Extending directions of the plurality of light guiding channels 521 are substantially parallel to each other, and the plurality of light guiding channels 521 are arranged in a bunch. In the embodiment, the light guiding channels 521 are defined by light guiding fibers 525. Because the extending direction of each light guiding fiber 525 is independent from each other, the guiding directions of the plurality of guiding channels 521 are independent from each other without interference.

Figure 23:
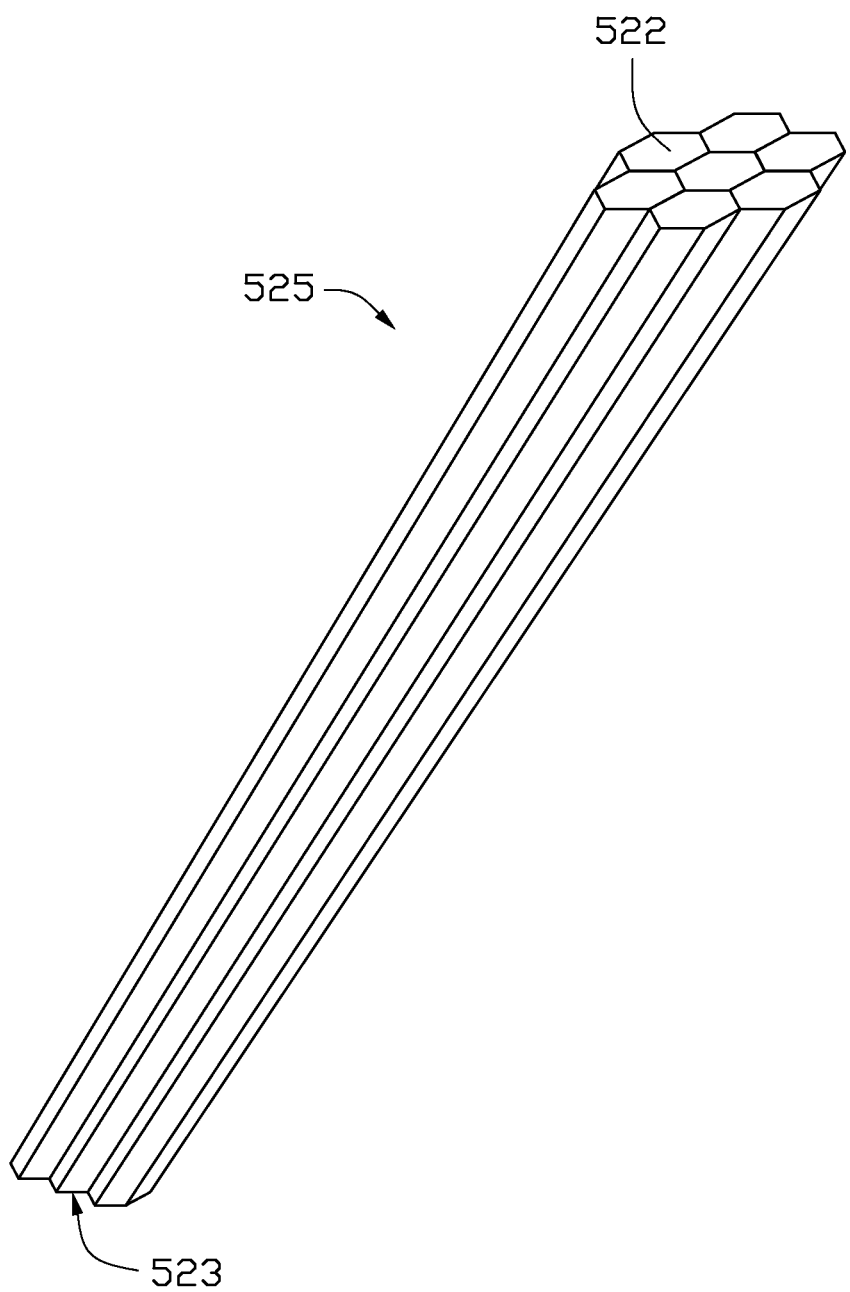
FIG. 23 is an enlarged, isometric view of tightly arranged light guiding fibers of the image compensating apparatus in FIG. 22.

The light guiding fibers 525 of the image compensating apparatus 520 has guiding directions parallel to each other, and are tightly arranged in bunch. FIG. 23 shows an enlarged, isometric view of tightly arranged light guiding fibers 525 of the image compensating apparatus 520 of FIG. 22. A cross section area of each light guiding fiber 525 is substantially in a hexagon shape. Side surfaces of each light guiding fiber 525 are combined to side surfaces of the light guiding fibers 525 arranged around the light guiding fiber 525, thereby forming a light guiding element including a plurality of light guiding fibers 525 arranged in bunch. When the light guiding channels 521 of the image compensating apparatus 520 of FIGS. 5, and 8-9, are defined by light guiding fibers 525, the detail structure of light guiding fibers 525 is same as shown in FIG. 22. That is, in FIGS. 8 and 9, gaps between adjacent bunches of light guiding fibers 525 are full with light guiding fibers 525, such that a completely light guiding fibers 525 matrix is formed. FIGS. 8 and 9 merely show structures of light guiding fibers 525 in different region.

Figure 24:
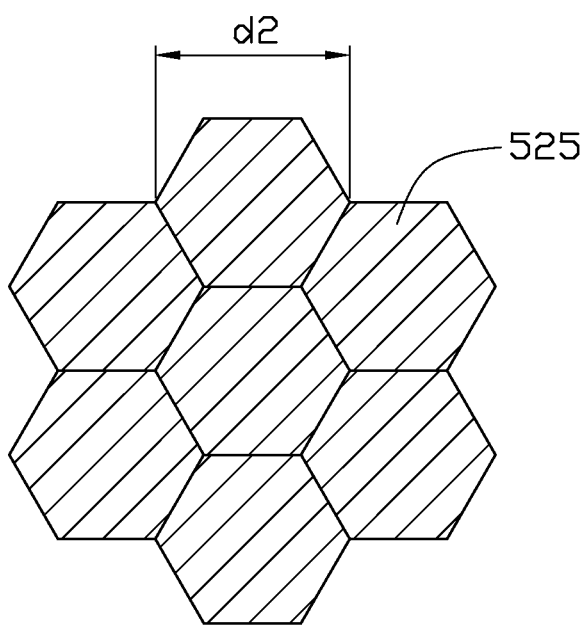
FIG. 24 is a cross-sectional view of the light guiding fibers in FIG. 22 along a direction perpendicular to extending directions of the light guiding fibers.

FIG. 24 shows a cross-sectional view of the light guiding fibers 525 in FIG. 22 along a direction perpendicular to extending directions of the light guiding fibers 525. The cross section area of each light guiding fiber 525 is hexagon, an outline diameter d2 is defined between opposite end points of the cross section area. The outline diameter d2 of each light guiding fiber 525 increases from the light incident surface 523 toward light emitting surface 522 gradually. The diameter d2 of each light guiding fiber 525 may be changed according to a requirement. In one embodiment, the diameters d2 of the longest light guiding fiber 525 increases from 3.3 um to 5 um.

Referring to FIG. 22 again, in the embodiment, the light incident surface 523 and the light emitting surface 522 are planar surfaces, and intersects with each other. The image compensating apparatus 520 further defines an inclined surface 524 interconnecting the light incident surface 523 and the light emitting surface 522. The inclined surface 524 is inclined to the light incident surface 523. The inclined surface 524 and the light incident surface 523 may define an obtuse angle, such as 135 degrees. The light incident surface 523 and the light emitting surface 522 define an acute angle, such as 18.4 degrees. The image compensating apparatus 520 is a pentahedron, and is bounded by the light incident surface 523, the light emitting surface 522, the inclined surface 524, a first end surface 528, and a second end surface 529. The inclined surface 524 is parallelogram, the light incident surface 523, the light emitting surface 522, the first end surface 528 and the second end surface 529 are triangle. Four edges of the inclined surface 524 connects with the light incident surface 523, the light emitting surface 522, the first end surface 528 and the second end surface 529.

The compensating portion 526 of the image compensating apparatus 520 may be defined by the plurality of light guiding channels 521. The image compensating apparatus 520 may also include a support portion 527 combined to the inclined surface 524. The support portion 527 is employed to support the compensating portion 526, and the image compensating apparatus 520. The support portion 527 has a height equal to that of the compensating portion 526, a bottom of the support portion 527 is coplanar to the light incident surface 523. In detail, the support portion 527 is substantially triangular prism, and defines a supporting surface 5271, a bottom surface 5270, and a connecting surface 5272. The supporting surface 5271 is combined to the inclined surface 524. The bottom surface 5270 is coplanar to the light incident surface 523. The connecting surface 5272 interconnects the supporting surface 5271 and the bottom surface 5270. In one embodiment, a cross section area of the support portion 527 is an isosceles right triangle. The bottom surface 5270 is perpendicular to the connecting surface 5272. The support portion 527 may be made of glass.

Figure 25:
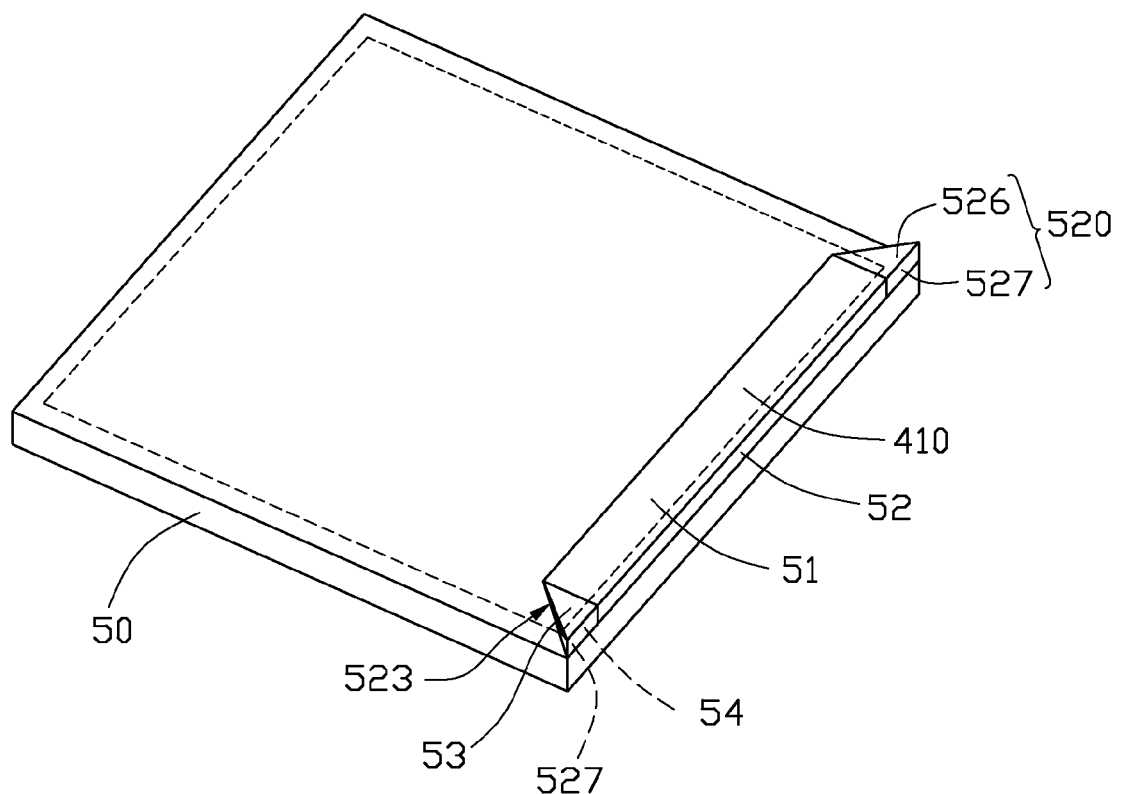
FIG. 25 is an isometric view of the image compensating apparatus of FIGS. 12, 22 disposed upon the display panel side by side.
Figure 26:
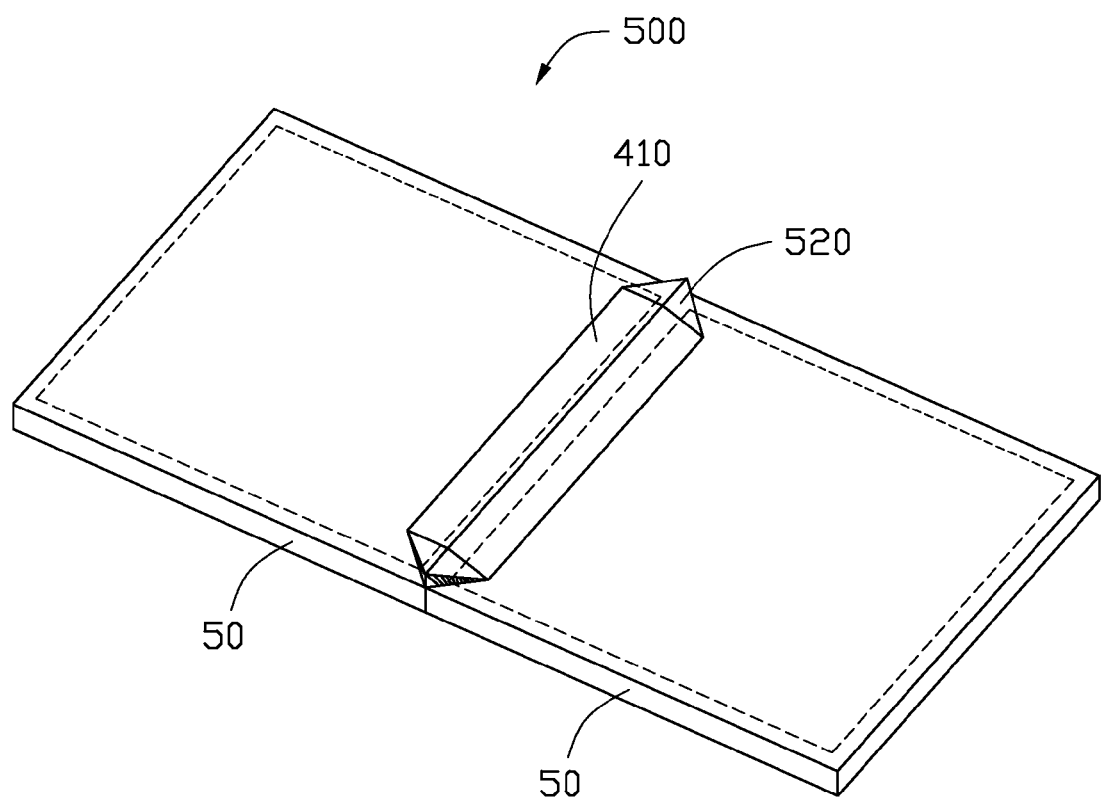
FIG. 26 is a display assembly jointed from two display panels.
Figure 27:
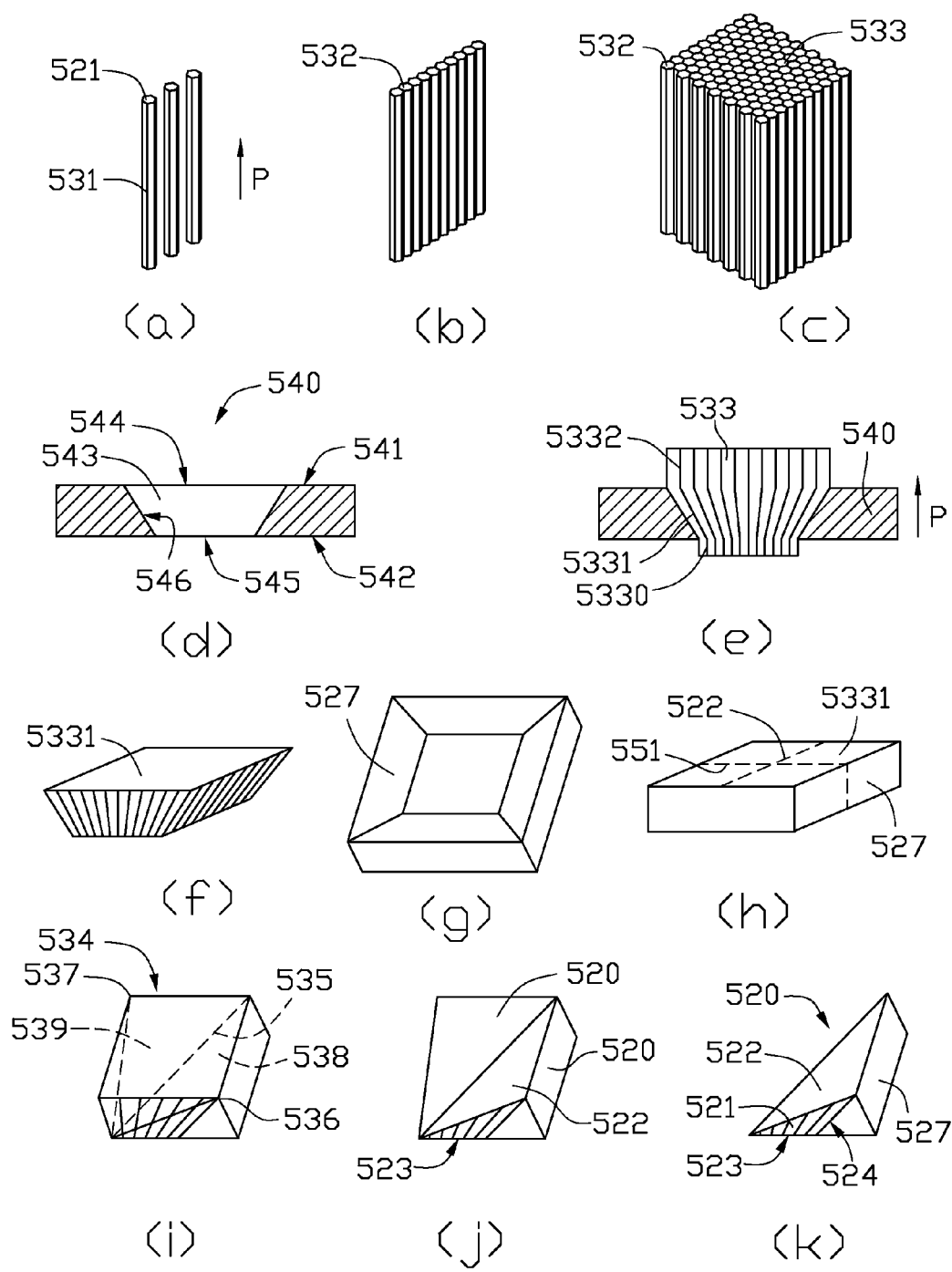
FIG. 27 is a schematic diagram of steps of a first embodiment of a manufacturing method for manufacturing the image compensating apparatus of FIG. 22.
Figure 28:
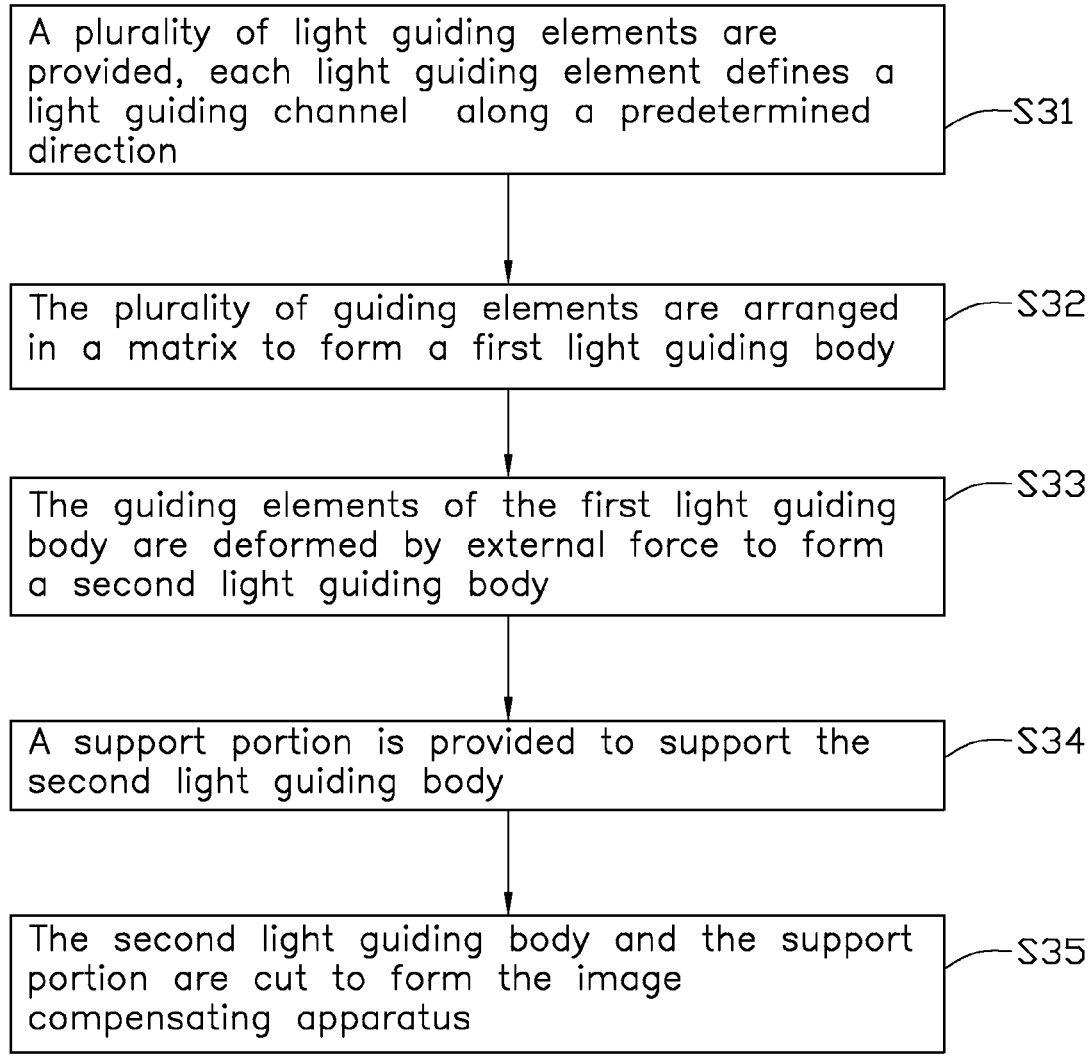
FIG. 28 is a flow chart of the manufacturing method in FIG. 27.

FIG. 25 shows an isometric view of the image compensating apparatus 410, 520 disposed upon the display panel 50 side by side. The compensating portion 526 of the image compensating apparatus 520 is disposed on a periphery display region 53 of the display panel 50, and adjacent to an edge of a non-display region 54. The compensating portion 526 is configured for display image introduced from the periphery display region 53 thereon, and covers the non-display region 54. The support portion 527 may be disposed upon the non-display region 54 and support the compensating portion 526. The sizes of the compensating portion 526 and the support portion 527 may be adjusted according to a requirement of the display panel 50. In one embodiment, the widths of the light incident surface 523 of the compensating portion 526 are about 10 millimeters. The area of the inclined surface 524 is equal to that of the supporting surface 527. The widths of the bottom surface 5270, and the connecting surface 5272 may be 5 millimeters. Preferably, the image compensating apparatus 520 may be disposed on the display panel 50 having non-display regions 52 and 54 (border region) with width 5 millimeters, such that the image from the periphery display region 53 is extended on the compensating portion 526, and completely covers the non-display regions 52, 54, thereby displaying image on the display panel 50 without lattice edge. FIG. 26 shows a display assembly 500 jointed from two display panels 50, the image compensating apparatus 410, 520 of the two display panels 50 are disposed on jointing portion of the two display panels 50, thereby displaying image introduced the periphery display region 53 thereon, and covers the non-display regions 52 and 54 (border regions) to accomplish a seamless splice or no black-edge splice of the two display panels 50. The displaying quality of the display assembly 500 is greatly enhanced. The image compensating apparatus 410, 520 employed in the display panel 50 enables a plurality of display panel 50 to be spliced in a plane without reducing a displaying quality. Also referring to FIGS. 27 and 28, FIG. 27 is a schematic diagram of steps of a first embodiment of a manufacturing method for manufacturing the image compensating apparatus 520 shown in FIG. 22. FIG. 28 is a flow chart of steps of the manufacturing method in FIG. 27.

The steps of the manufacturing method of the image compensating apparatus 520 includes steps as S31-S34. FIGS. 27(a), 27(b), 27(c), 27(f), 27(g), 27(h) 27(i), 27(j) are isometric views, FIGS. 17(d), 17(e) are side views, one skilled in the art can easily understand.

Referring to FIG. 27, in step S31, a plurality of light guiding elements 531 are provided, each light guiding element 531 defines a light guiding channel 521 along a predetermined direction P. In detail, the light guiding elements 431 are defined by light guiding fibers Referring to FIG. 27(b)-(c), in step S32, the plurality of guiding elements 531 are arranged in a matrix to form a first light guiding body 533. In detail, the plurality of light guiding elements 531 are divided in a number of groups each arranged in single layer/two layers/a plurality of layers types, to form a plurality of light guiding films 532. The plurality of light guiding films 532 is laminated and adhered together in high temperature to form the first light guiding body 533. In the embodiment, the light guiding body 533 is cuboid. The predetermined direction P is perpendicular to a top surface and a bottom surface of the cuboid of the first light guiding body 533.

In step S33, the guiding elements 531 of the first light guiding body 533 are deformed by external force to form a second light guiding body 5331. That is, a diameter of cross section area of each guiding element 531 of the second light guiding body 5331 decreases from an end to an opposite end. In the step S33, the first light guiding body 533 may be pulled or extruded to make the diameter of each guiding element 531 decreases from an end to an opposite end. Referring to FIG. 27(d)-(e), in the embodiment, the first light guiding body 533 is positioned in a refitting mould 540, and extrudes in the refitting mould 540 to enable the first light guiding body 533 to be deformed. In detail, the refitting mould 540 defines a first surface 541, a second surface 542, and a cavity 543 cutting through the first surface 541 and the second surface 542. The cavity 543 includes a first opening 544 defined on the first surface 541, a second opening 545 defined on the second surface 542, and four connecting surfaces 546 interconnecting the first surface 541 and the second surface 542. A size of the second opening 545 is less than that of the first opening 544, and less than a size of cross section area of the first light guiding body 533. In a predetermined temperature, the first light guiding body 533 is positioned in the refitting mould 540, and extruded in the refitting mould 540 to be deformed, the steps is illustrated as follow: the first light guiding body 533 is positioned in the cavity 543 via the first opening 544 and is extruded to expose an end 5330 of the first light guiding body 533 out of the second opening 545. Then, the first light guiding body 533 is cut along the first surface 541 and the second surface 542, thereby obtaining the second light guiding body 5331 with the end 5330 and the portion exposed out of the first opening 543 removed. The cavity 543 is substantially a frusta rectangular pyramid, the four connecting surfaces 546 are four side surfaces of the frusta rectangular pyramid. The first opening 544 and the second opening 545 are rectangular and respectively correspond to a top surface and a bottom surface of the second light guiding body 5331.

Referring to FIG. 27, the second light guiding body 5331 extruded from the cavity 543 is also substantially a frusta rectangular pyramid. The top surface and the bottom surface of the second light guiding body 5331 are parallel to each other and are rectangular. An area of the top surface is greater than that of the bottom surface, the predetermined direction P is defined from the bottom surface to the top surface.

Referring to FIGS. 27(g)-(h), in step S34, a support portion 527 is provided to support the second light guiding body 5331. In detail, the second light guiding body 5331 is received in the support portion 527, and is combined to the support portion 527 by four side surface. In the embodiment, the second light guiding body 5331 is combined to the support portion 527 by adhering or lamination in high temperature. The support portion 417 is made of glass.

Referring to FIGS. 27(h)-(k), in step S35, the second light guiding body 5331 and the support portion 527 are cut to form the image compensating apparatus 520. The image compensating apparatus 520 includes a light incident surface 523, and a light emitting surface 522 connected to an edge of the light incident surface 523. An area of a projection of the light emitting surface 522 on the light incident surface 523 is greater than that of the light incident surface 523. The light guiding channel 521 extends from the light incident surface 523 to the light emitting surface 522, and cross section area of each light guiding channel 521 increases from the light incident surface 523 toward the light emitting surface 522. Referring to FIG. 27(h)-(i), the second light guiding body 5331 and the support portion 527 are cut along a first cutting surface 521 and a second cutting surface 552. The first cutting surface 521 is perpendicular to a top of the second light guiding body 5331 and the support portion 527, the second cutting surface 552 is perpendicular to a top of the second light guiding body 5331 and the support portion 527, and perpendicular to the first cutting surface 551. The cutting steps for cutting the second light guiding body 5331 and the support portion 527 includes steps: the second light guiding body 5331 and the support portion 527 are cut along the first cutting surface 551 and the second cutting surface 552 to form a first cutting body 534.

Referring to FIG. 27(i)-(j), opposite end points of a top of the first cutting body 534 and a diagonal line 535 of the first cutting body 534 respectively define a third cutting plane 538, and a fourth cutting plane 539. The step of cutting the second light guiding body 5331 further includes steps: the first cutting body 534 is cut along the third cutting plane 538 and the fourth cutting plane 539 to obtain the image compensating apparatus 520. The image compensating apparatus 520 may be employed as the periphery image compensating apparatus 212 of in FIGS. 5 and 8. The image compensating apparatus 520 defines two light emitting surfaces 522 cooperatively forming a groove in "V" shape. The groove has a depth decreasing along a direction away from the light incident surface 523. The first cutting body 534 may be cut along the diagonal line 535 firstly to from a pair of symmetrically halves, thereafter cutting along the third cutting plane 538 or the fourth cutting plane 539 to form a half of the image compensating apparatus 520, thus the image compensating apparatus 520 can be used in of FIG. 22, if necessary.

Figure 29:
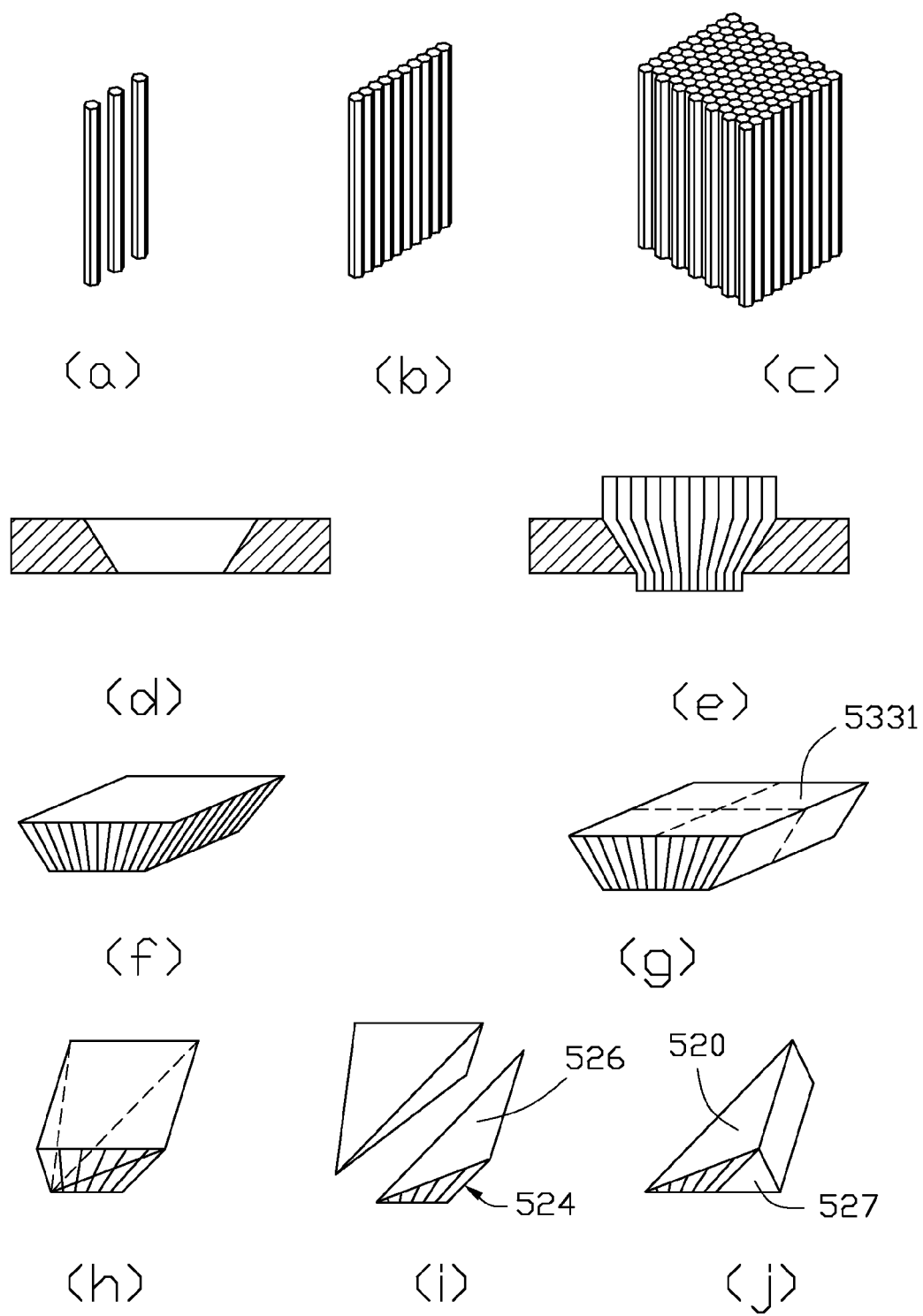
FIG. 29 is a schematic diagram of steps of a second embodiment of a manufacturing method for manufacturing the image compensating apparatus of FIG. 22.
Figure 30:
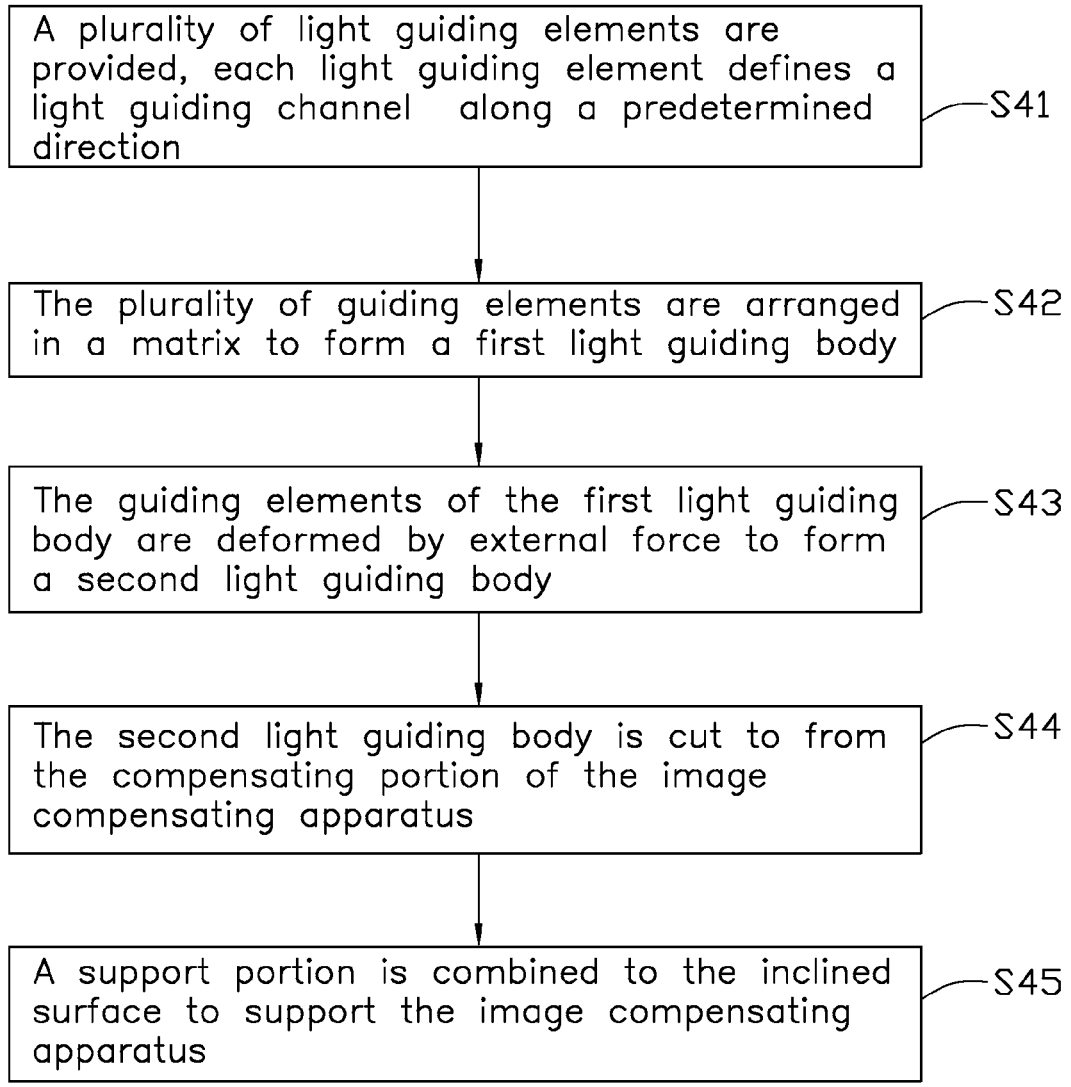
FIG. 30 is a flow chart of the manufacturing method of FIG. 29.

Referring to FIGS. 29-30, FIG. 29 is a schematic diagram of steps of a second embodiment of a manufacturing method for manufacturing the image compensating apparatus 520 of FIG. 22. FIG. 30 is a flow chart of the manufacturing method of FIG. 29. The difference between the second embodiment and the first embodiment of the manufacturing is that: in FIG. 29, the support portion 527 is combined to the image compensating apparatus 520 at last. In step S44, the second light guiding body 5331 is cut to from the compensating portion 526 of the image compensating apparatus 520. In step S45, a support portion 527 is combined to the inclined surface 524 to support the image compensating apparatus 520.

The image compensating apparatus 410 and 520 can be disposed on the periphery display regions 41, 53 of the display panel 50, and the image form periphery display regions 41, 53 is introduced into the light incident surfaces 413, 523, and transmitted and expanded to the emitting surfaces 412, 522, thus the image is extended. And in addition, the image expanded on the emitting surfaces 412, 522 cover the non-display regions 42, 52, 54, thereby displaying without black edge.

Furthermore, for display assemblies 400 or 500 jointed from two display panels 40, 50, the images expanded on the emitting surfaces 412, 522 cover the non-display regions 42, 52, 54, thereby displaying without black edge. Such that, the image compensating apparatus 410, 520 employed in the display panel 50 enables a plurality of display panels 40, 50 to be spliced in a plane without black edges and without reducing a displaying quality.

The angles and sizes of above described image compensating apparatus 410, 520 may be changed according to a design requirement. The angles and sizes of the image compensating apparatus 410, 520 shown in the present invention is merely for illustrating, not for limiting, one skilled in the prior can easily understand.

Furthermore, a method for manufacturing a display is also provided. The method may include the above steps S11~S14, S21~S24, S31~S35, or S41~S45, and further includes a step S51. In step S51, the image compensating apparatus obtained in the step S14, S24, S35 or S45 is positioned adjacent and corresponding to a periphery display region of the display.

It is to be understood that even though numerous characteristics and advantages of the present embodiments have been set forth in the foregoing description, together with details of the structures and functions of the embodiments, the disclosure is illustrative only; and that changes may be made in detail, especially in matters of shape, size, and arrangement of parts, within the principles of the embodiments, to the full extent indicated by the broad general meaning of the terms in which the appended claims are expressed.

What is claimed is:

1. A method for manufacturing an image compensating apparatus, comprising:
providing a plurality of light guiding elements, each light guiding element defining a light guiding channel extending along a predetermined direction;
arranging the plurality of light guiding elements in a matrix to form a light guiding element; and
cutting the light guiding element along at least one cutting plane intersecting the predetermined direction to obtain a compensating portion of the image compensating apparatus, the compensating portion comprising a light incident surface and a light emitting surface, an area of the light emitting surface greater than an area of the light incident surface, and each light guiding channel extending from the light incident surface to the light emitting surface.

2. The method of claim 1, wherein each light guiding element is a light guiding fiber, and an area of the light guiding fiber on the light emitting surface is greater than an area of the light guiding fiber on the light incident surface.

3. The method of claim 2, wherein a cross section area of the light guiding fiber is maintained constant.

4. The method of claim 1, wherein the step of arranging the plurality of light guiding elements in the matrix to form the light guiding element comprises:
arranging and attaching the plurality of light guiding elements into a plurality of light guiding films by adhering or lamination in high temperature; and
arranging and attaching the plurality of light guiding films to the light guiding element by adhering or lamination in high temperature.

5. The method of claim 4, wherein the light guiding element is substantial a cuboid, the light guiding channel extending from a top surface of the cuboid to a bottom surface of the cuboid, and the predetermined direction perpendicular to the top surface and the bottom surface of the cuboid.

6. The method of claim 5, wherein the at least one cutting plane comprises a first cutting plane and a second cutting plane, the first cutting plane defined by diagonal lines of a pair of symmetrical side surfaces of the light guiding element, the second cutting plane intersecting with the first cutting plane, the step of cutting the light guiding element along at least one cutting plane intersecting the predetermined direction to obtain the image compensating apparatus comprising cutting the light guiding element along the first cutting plane to obtain a tri-prism light guiding element; and cutting the tri-prism light guiding element along the second cutting plane to obtain the compensating portion of the image compensating apparatus.

7. The method of claim 4, wherein the light guiding element comprises a top surface, a bottom surface, a front surface, a rear surface, and a pair of side surface, the top surface, the bottom surface, the front surface, and the rear surface are substantially rectangular, the pair of side surfaces are parallel to each other and substantially parallelogram, the predetermined direction are parallel to the front surface, the back surface, and the pair of side surface, the predetermined direction and the bottom surface define an acute angel.

8. The method of claim 7, wherein the at least one cutting plane comprises a first cutting plane, the first cutting plane defined by diagonal lines of the pair of side surfaces of the light guiding element, the step of cutting the light guiding element along at least one cutting plane intersecting the predetermined direction to obtain the image compensating apparatus comprising:

cutting the light guiding element along the first cutting plane to obtain the compensating portion of the image compensating apparatus.

9. The method of claim 7, wherein each of the light incident surface and the light emitting surface is a planar surface, the light incident surface intersects with the light emitting surface, and the compensating portion further comprises an inclined surface connected between the light incident surface and the light emitting surface.

10. The method of claim 9, further comprising:

attaching a support portion to the inclined surface to support the compensating portion.

11. The method of claim 1, wherein each of the light incident surface and the light emitting surface is a planar surface, and the light incident surface intersects with the light emitting surface.

12. A method for manufacturing a display, comprising:

providing a plurality of light guiding elements, each light guiding element defining a light guiding channel extending along a predetermined direction;

arranging the plurality of light guiding elements in a matrix to form a light guiding element;

cutting the light guiding element along at least one cutting plane intersecting the predetermined direction to obtain a compensating portion of the image compensating apparatus, the compensating portion comprising a light incident surface and a light emitting surface, an area of the light emitting surface greater than an area of the light incident surface, and each light guiding channel extending from the light incident surface to the light emitting surface; and positioning the compensating portion of an image compensating apparatus adjacent and corresponding to a periphery display region of the display.

* * * * *